US010189943B2

(12) United States Patent
Weber et al.

(10) Patent No.: US 10,189,943 B2
(45) Date of Patent: Jan. 29, 2019

(54) COPOLYMERS SUITABLE FOR MAKING MEMBRANES

(71) Applicant: BASF SE, Ludwigshafen (DE)

(72) Inventors: Martin Weber, Maikammer (DE);
Szilard Csihony, Gorxheimertal (DE);
Thomas Weiss, Ilvesheim (DE)

(73) Assignee: BASF SE, Ludwigshafen (DE)

( * ) Notice: Subject to any disclaimer, the term of this patent is extended or adjusted under 35 U.S.C. 154(b) by 185 days.

(21) Appl. No.: 15/123,734

(22) PCT Filed: Mar. 2, 2015

(86) PCT No.: PCT/EP2015/054242
§ 371 (c)(1),
(2) Date: Sep. 6, 2016

(87) PCT Pub. No.: WO2015/132173
PCT Pub. Date: Sep. 11, 2015

(65) Prior Publication Data
US 2017/0073467 A1 Mar. 16, 2017

(30) Foreign Application Priority Data

Mar. 6, 2014 (EP) ..................................... 14158139

(51) Int. Cl.
| | | |
|---|---|---|
| *C08G 65/08* | (2006.01) | |
| *C08G 65/26* | (2006.01) | |
| *C08G 65/334* | (2006.01) | |
| *C08G 75/23* | (2006.01) | |
| *C08L 81/00* | (2006.01) | |
| *B01D 71/26* | (2006.01) | |
| *B01D 71/52* | (2006.01) | |
| *B01D 71/68* | (2006.01) | |
| *B01D 71/80* | (2006.01) | |
| *B01D 61/00* | (2006.01) | |
| *C02F 1/44* | (2006.01) | |
| *B01D 67/00* | (2006.01) | |

(52) U.S. Cl.
CPC ........... *C08G 65/08* (2013.01); *B01D 61/002* (2013.01); *B01D 67/0006* (2013.01); *B01D 71/26* (2013.01); *B01D 71/52* (2013.01); *B01D 71/68* (2013.01); *B01D 71/80* (2013.01); *C02F 1/445* (2013.01); *C08G 65/2612* (2013.01); *C08G 65/3346* (2013.01); *C08G 75/23* (2013.01); *C08L 81/00* (2013.01); *C08G 2340/00* (2013.01)

(58) Field of Classification Search
None
See application file for complete search history.

(56) References Cited

U.S. PATENT DOCUMENTS

| | | |
|---|---|---|
| 4,327,201 A | 4/1982 | Kennedy et al. |
| 4,870,153 A | 9/1989 | Matzner et al. |
| 4,946,889 A | 8/1990 | Nishioka |
| 5,169,914 A | 12/1992 | Kaszas et al. |
| 5,700,902 A | 12/1997 | Hancock et al. |
| 5,700,903 A | 12/1997 | Hancock et al. |
| 5,798,437 A | 8/1998 | Hancock et al. |
| 5,834,583 A | 11/1998 | Hancock et al. |
| 5,861,471 A | 1/1999 | Pudleiner et al. |
| 5,911,880 A | 6/1999 | Klein et al. |
| 6,365,678 B1 | 4/2002 | Reuter et al. |
| 2008/0293886 A1 | 11/2008 | Karl et al. |

FOREIGN PATENT DOCUMENTS

| | | |
|---|---|---|
| EP | 0 113 112 A1 | 7/1984 |
| EP | 0 135 130 A2 | 3/1985 |
| EP | 0 206 756 A2 | 12/1986 |
| EP | 0 265 053 A2 | 4/1988 |
| EP | 0 297 363 A2 | 1/1989 |
| EP | 0 739 925 A2 | 10/1996 |
| EP | 0 937 492 A2 | 8/1999 |
| EP | 1 743 690 A1 | 1/2007 |
| EP | 2 008 704 A1 | 12/2008 |
| EP | 2 158 958 A1 | 3/2010 |
| EP | 2 554 564 A1 | 2/2013 |
| WO | WO 97/05190 A1 | 2/1997 |
| WO | WO 97/22406 A1 | 6/1997 |
| WO | WO 02/48215 A2 | 6/2002 |
| WO | WO 03/074577 A1 | 9/2003 |
| WO | WO 2004/009654 A1 | 1/2004 |
| WO | WO 2004/035635 A1 | 4/2004 |
| WO | WO 2004/113402 A1 | 12/2004 |
| WO | WO 2010/121628 A1 | 10/2010 |

OTHER PUBLICATIONS

Functional Polymers and Sequential Copolymers by Phase Transfer Catalysis. XXVIII. Synthesis and Characterization of Alternating Block Copolymers and Polyformals of Polyisobutylene and Aromatic Polyether Sulfone—Percec, Virgil et al—Journal of Polymer Science (Year: 1988).*
15123734-564308—EICSEARCH.pdf—STIC structure and text search (Year: 2018).*
International Search Report and Written Opinion dated May 4, 2015 in PCT/EP2015/054242.

* cited by examiner

*Primary Examiner* — Krishnan S Menon
*Assistant Examiner* — Bradley R Spies
(74) *Attorney, Agent, or Firm* — Oblon, McClelland, Maier & Neustadt, L.L.P.

(57) ABSTRACT

Copolymer comprising polyarylene ether blocks and hydrophilic-hydrophobic blocks, wherein said hydrophilic-hydrophobic blocks comprise polyisobutene blocks.

25 Claims, No Drawings

COPOLYMERS SUITABLE FOR MAKING MEMBRANES

This application is a National Stage of PCT/EP2015/054242, which was filed on Mar. 2, 2015. This application is based upon and claims the benefit of priority to European Application No. 14158139.7, which was filed on Mar. 6, 2014.

This invention is related to copolymers comprising polyarylene ether blocks and hydrophilic-hydrophobic blocks, wherein said hydrophilic-hydrophobic blocks comprise polyisobutene blocks.

This invention is further related to membranes comprising such copolymers.

This invention is further related to processes for making and uses of such copolymers and membranes.

Polyether sulfones and polysulfones belong to the group of high-performance thermoplastics (E. M. Koch, H.-M. Walter, Kunststoffe 80 (1990) 1146; E. Döring, Kunststoffe 80 (1990), 1149). Owing to their good biocompatibility, polyether sulfones and polysulfones are also used as material for the production of dialysis membranes (S. Savariar, G. S. Underwood, E. M. Dickinson, P. J. Schielke, A. S. Hay, Desalination 144 (2002) 15).

The preparation of the polyether sulfones and polysulfones is usually effected by polycondensation of suitable monomer building blocks in dipolar aprotic solvents at elevated temperature (R. N. Johnson et al., J. Polym. Sci. A-1 5 (1967) 2375, J. E. McGrath et al., Polymer 25 (1984) 1827).

The preparation of polyarylene ether sulfones from suitable aromatic bishalosulfones and aromatic bisphenols or salts thereof in the presence of at least one alkali metal or ammonium carbonate or bicarbonate in an aprotic solvent is described, for example, in U.S. Pat. No. 4,870,153, EP 113 112, EP-A 297 363 and EP-A 135 130.

One disadvantage of pure polyarylene ethers is their low hydrophilicity. To enhance the hydrophilicity of polyarylene ethers, polyethersulfone (PESU)-polyethyleneoxide (PEO) block copolymers have been prepared.

The synthesis of polyarylene ether-polyalkylene oxide copolymers described in Macromolecules 29 (23) p. 7619 (1996) requires long reaction times.

EP 739 925, U.S. Pat. No. 5,700,902 and U.S. Pat. No. 5,700,903 also describe polyarylene ether and polyalkylene oxide copolymers.

U.S. Pat. No. 5,700,902 discloses block copolymers with hydrophobic blocks and hydrophilic blocks, wherein hydrophilic blocks can be PEO blocks that are endcapped on one side with an alkyl group.

U.S. Pat. No. 5,798,437, U.S. Pat. No. 5,834,583, WO 97/22406 disclose processes for the manufacture of hydrophilic copolymers.

U.S. Pat. No. 5,911,880 discloses membranes made of polyether sulfone comprising an amphiphilic additive.

EP 739 925 A1 discloses polysulfone-polyether block copolycondensates.

It was an object of the present invention to provide copolymers that are mechanically flexible, easily wettable with water, that have a high upper glass transition temperature and that are suitable for making membranes.

This object has been solved by copolymers comprising polyarylene ether blocks and hydrophilic-hydrophobic blocks, wherein said hydrophilic-hydrophobic blocks comprise polyisobutene blocks.

Suitable polyarylene ether blocks of copolymers according to the invention are known as such to those skilled in the art and can be formed from polyarylene ether units of the general formula IV

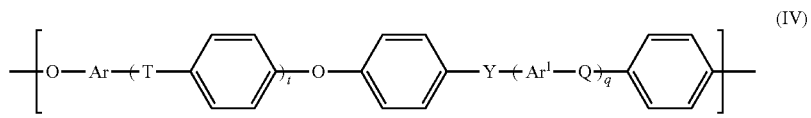

(IV)

with the following definitions:

t, q: each independently 0, 1, 2 or 3,

Q, T, Y: each independently a chemical bond or group selected from —O—, —S—, —SO$_2$—, S=O, C=O, —N=N—, —CR$^a$R$^b$— where R$^a$ and R$^b$ are each independently a hydrogen atom or a C$_1$-C$_{12}$-alkyl, C$_1$-C$_{12}$-alkoxy or C$_6$-C$_{18}$-aryl group, where at least one of Q, T and Y is not —O—, and at least one of Q, T and Y is —SO$_2$—, and Ar, Ar$^1$: each independently an arylene group having from 6 to 18 carbon atoms The polyarylene ethers are typically prepared by polycondensation of suitable starting compounds in dipolar aprotic solvents at elevated temperature (see, for example, R. N. Johnson et al., J. Polym. Sci. A-1 5 (1967) 2375, J. E. McGrath et al., Polymer 25 (1984) 1827).

Suitable polyarylene ether blocks can be provided by reacting at least one starting compound of the structure X—Ar—Y (M1) with at least one starting compound of the structure HO—Ar$^1$—OH (M2) in the presence of a solvent (L) and of a base (B), where Y is a halogen atom, X is selected from halogen atoms and OH, preferably from halogen atoms, especially F, Cl or Br, and Ar and Ar$^1$ are each independently an arylene group having 6 to 18 carbon atoms.

In one embodiment, a polyarylene ether which is formed from units of the general formula IV with the definitions as above is provided in the presence of a solvent (L):

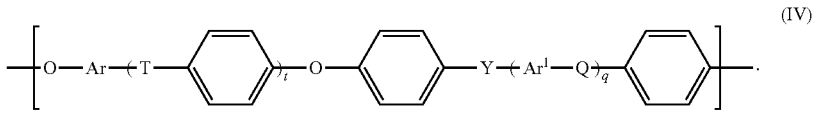

(IV)

If Q, T or Y, with the abovementioned prerequisites, is a chemical bond, this is understood to mean that the group adjacent to the left and the group adjacent to the right are bonded directly to one another via a chemical bond.

Preferably, Q, T and Y in formula (IV), however, are independently selected from —O— and —SO$_2$—, with the proviso that at least one of the group consisting of Q, T and Y is —SO$_2$—.

When Q, T or Y are —CR$^a$R$^b$—, R$^a$ and R$^b$ are each independently a hydrogen atom or a C$_1$-C$_{12}$-alkyl, C$_1$-C$_{12}$-alkoxy or C$_6$-C$_{18}$-aryl group.

Preferred C$_1$-C$_{12}$-alkyl groups comprise linear and branched, saturated alkyl groups having from 1 to 12 carbon atoms. Particularly preferred C$_1$-C$_{12}$-alkyl groups are: C$_1$-C$_6$-alkyl radicals such as methyl, ethyl, n-propyl, iso-propyl, n-butyl, sec-butyl, 2- or 3-methylpentyl and longer-chain radicals such as unbranched heptyl, octyl, nonyl, decyl, undecyl, lauryl, and the singularly or multiply branched analogs thereof.

Useful alkyl radicals in the aforementioned usable C$_1$-C$_{12}$-alkoxy groups include the alkyl groups having from 1 to 12 carbon atoms defined above. Cycloalkyl radicals usable with preference comprise especially C$_3$-C$_{12}$-cycloalkyl radicals, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclpentylethyl, -propyl, -butyl, -pentyl, -hexyl, cyclohexylmethyl, -dimethyl, -trimethyl.

Ar and Ar$^1$ are each independently a C$_6$-C$_{18}$-arylene group. Proceeding from the starting materials described below, Ar is preferably derived from an electron-rich aromatic substance which is preferably selected from the group consisting of hydroquinone, resorcinol, dihydroxynaphthalene, especially 2,7-dihydroxynaphthalene, and 4,4'-bisphenol. Ar$^1$ is preferably an unsubstituted C$_6$- or C$_{12}$-arylene group.

Useful C$_6$-C$_{18}$-arylene groups Ar and Ar$^1$ are especially phenylene groups, such as 1,2-, 1,3- and 1,4-phenylene, naphthylene groups, for example 1,6-, 1,7-, 2,6- and 2,7-naphthylene, and the arylene groups derived from anthracene, phenanthrene and naphthacene.

Preferably, Ar and Ar$^1$ in the preferred embodiments of the formula (IV) are each independently selected from the group consisting of 1,4-phenylene, 1,3-phenylene, naphthylene, especially 2,7-dihydroxynaphthalene, and 4,4'-bisphenylene.

Units present with preference within the polyarylene ether are those which comprise at least one of the following repeat structural units IVa to IVo:

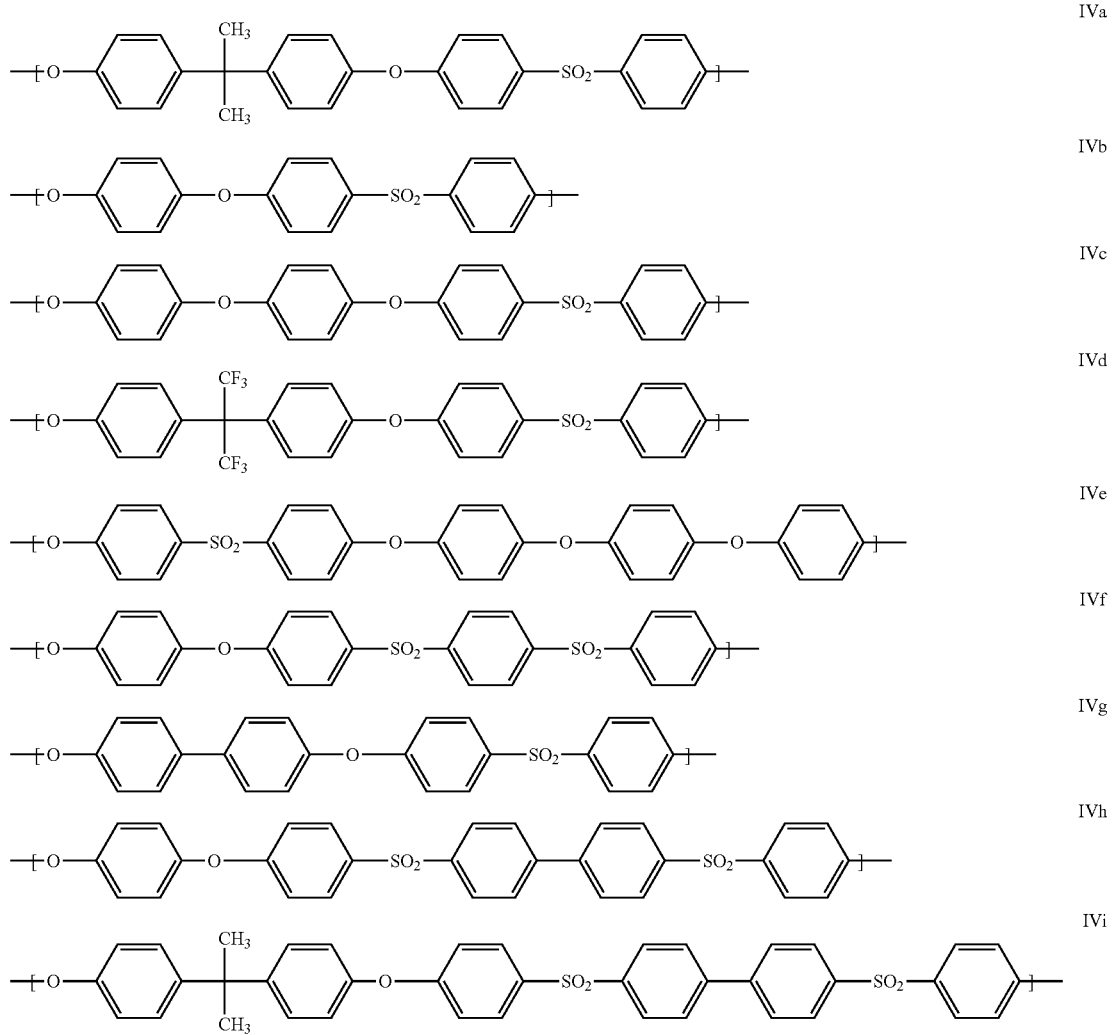

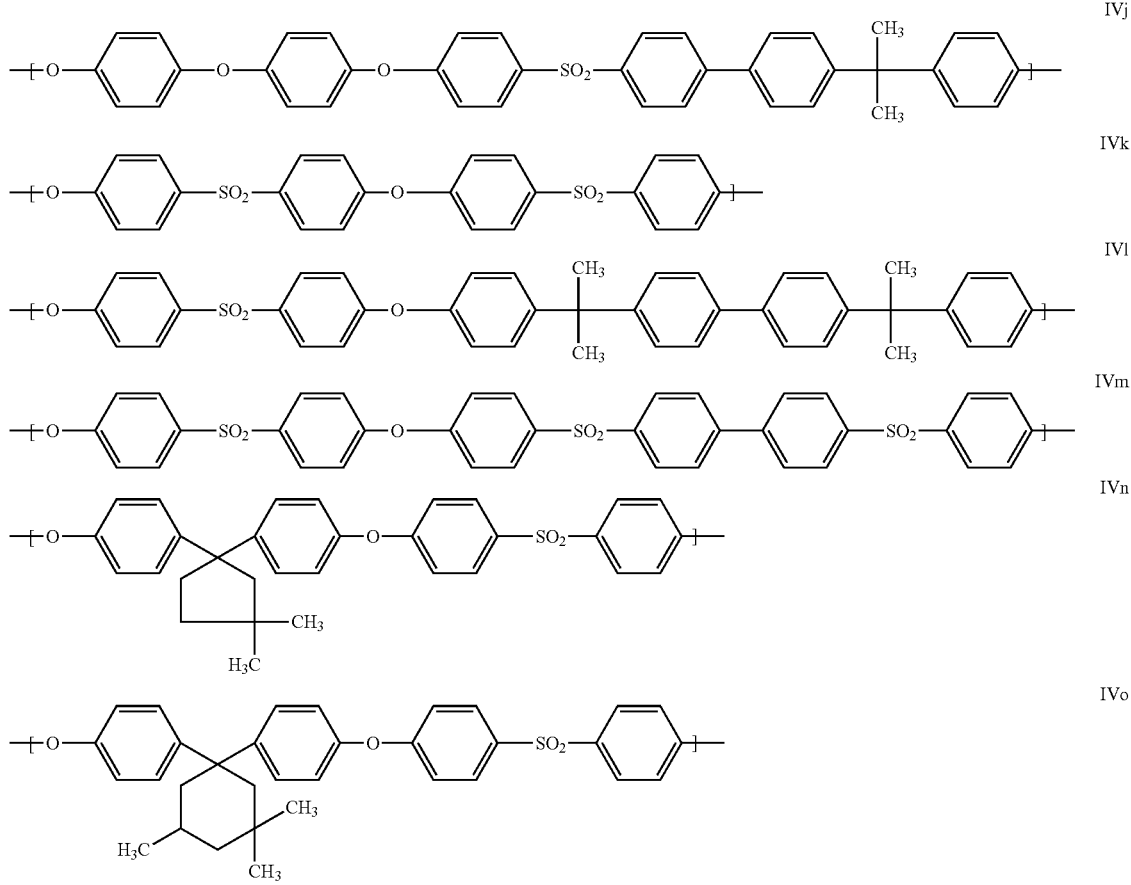

In addition to the units IVa to IVo present with preference, preference is also given to those units in which one or more 1,4-dihydroxyphenyl units are replaced by resorcinol or dihydroxynaphthalene units.

Particularly preferred units of the general formula IV are units IVa, IVg and IVk. It is also particularly preferred when the polyarylene ether blocks are formed essentially from one kind of units of the general formula IV, especially from one unit selected from IVa, IVg and IVk.

In a particularly preferred embodiment, Ar=1,4-phenylene, t=1, q=0, T=$SO_2$ and Y=$SO_2$. Such polyarylene ethers are referred to as polyether sulfone (PESU).

Suitable polyarylene ether blocks preferably have a mean molecular weight Mn (number average) in the range from 2000 to 70000 g/mol, especially preferably 5000 to 40000 g/mol and particularly preferably 7000 to 30000 g/mol. The average molecular weight of the polyarylene ether blocks can be controlled and calculated by the ratio of the monomers forming the polyarylene ether blocks, as described by H. G. Elias in "An Introduction to Polymer Science" VCH Weinheim, 1997, p. 125.

Suitable starting compounds are known to those skilled in the art and are not subject to any fundamental restriction, provided that the substituents mentioned are sufficiently reactive within a nucleophilic aromatic substitution.

Preferred starting compounds are difunctional. "Difunctional" means that the number of groups reactive in the nucleophilic aromatic substitution is two per starting compound. A further criterion for a suitable difunctional starting compound is a sufficient solubility in the solvent, as explained in detail below.

Preference is given to monomeric starting compounds, which means that the reaction is preferably performed proceeding from monomers and not proceeding from prepolymers.

The starting compound (M1) used is preferably a dihalodiphenyl sulfone. The starting compound (M2) used is preferably dihydroxydiphenyl sulfone.

Suitable starting compounds (M1) are especially dihalodiphenyl sulfones such as 4,4'-dichlorodiphenyl sulfone, 4,4'-difluorodiphenyl sulfone, 4,4'-dibromodiphenyl sulfone, bis(2-chlorophenyl) sulfones, 2,2'-dichlorodiphenyl sulfone and 2,2'-difluorodiphenyl sulfone, particular preference being given to 4,4'-dichlorodiphenyl sulfone and 4,4'-difluorodiphenyl sulfone.

Preferred compounds (M2) are accordingly those having two phenolic hydroxyl groups.

Phenolic OH groups are preferably reacted in the presence of a base in order to increase the reactivity toward the halogen substituents of the starting compound (M1).

Preferred starting compounds (M2) having two phenolic hydroxyl groups are selected from the following compounds:
dihydroxybenzenes, especially hydroquinone and resorcinol;
dihydroxynaphthalenes, especially 1,5-dihydroxynaphthalene, 1,6-dihydroxynaphthalene, 1,7-dihydroxynaphthalene, and 2,7-dihydroxynaphthalene;
dihydroxybiphenyls, especially 4,4'-biphenol and 2,2'-biphenol;

bisphenyl ethers, especially bis(4-hydroxyphenyl) ether and bis(2-hydroxyphenyl) ether;

bisphenylpropanes, especially 2,2-bis(4-hydroxyphenyl) propane, 2,2-bis(3-methyl-4-hydroxyphenyl)propane and 2,2-bis(3,5-dimethyl-4-hydroxyphenyl)propane;

bisphenylmethanes, especially bis(4-hydroxyphenyl) methane;

bisphenyl sulfones, especially bis(4-hydroxyphenyl) sulfone;

bisphenyl sulfides, especially bis(4-hydroxyphenyl) sulfide;

bisphenyl ketones, especially bis(4-hydroxyphenyl) ketone;

bisphenylhexafluoropropanes, especially 2,2-bis(3,5-dimethyl-4-hydroxyphenyl)hexafluoropropane; and bisphenylfluorenes, especially 9,9-bis(4-hydroxyphenyl) fluorene;

1,1-Bis(4-hydroxyphenyl)-3,3,5-trimethyl-cyclohexane (bisphenol TMC).

It is preferable, proceeding from the aforementioned aromatic dihydroxyl compounds (M2), by addition of a base (B), to prepare the dipotassium or disodium salts thereof and to react them with the starting compound (M1). The aforementioned compounds can additionally be used individually or as a combination of two or more of the aforementioned compounds.

Hydroquinone, resorcinol, dihydroxynaphthalene, especially 2,7-dihydroxynaphthalene, bisphenol A, dihydroxydiphenyl sulfone and 4,4'-bisphenol are particularly preferred as starting compound (M2).

However, it is also possible to use trifunctional compounds. In this case, branched structures are the result. If a trifunctional starting compound (M2) is used, preference is given to 1,1,1-tris(4-hydroxyphenyl)ethane.

The ratios to be used derive in principle from the stoichiometry of the polycondensation reaction which proceeds with theoretical elimination of hydrogen chloride, and are established by the person skilled in the art in a known manner.

In a preferred embodiment, the ratio of halogen end groups to phenolic end groups is adjusted by controlled establishment of an excess of the dihalogen starting compound (M1) in relation to a difunctional compound (M2) as starting compound and hydrophilic-hydrophobic blocks are employed.

More preferably, the molar (M1)/(M2) ratio in this embodiment is from 1.003 to 1.25, especially from 1.005 to 1.15, most preferably from 1.01 to 1.1.

Preferably, the molar (M1)/(M2+hydrophilic-hydrophobic blocks) ratio is 1.005 to 1.2.

Alternatively, it is also possible to use a starting compound (M1) where X=halogen and Y=OH. In this case, the ratio of halogen to OH end groups used is preferably from 1.003 to 1.2, especially from 1.005 to 1.15, most preferably 1.01 to 1.1.

Preferably, the conversion in the polycondensation is at least 0.9, which ensures a sufficiently high molecular weight.

Solvents (L) preferred in the context of the present invention are organic, especially aprotic polar solvents. Suitable solvents also have a boiling point in the range from 80 to 320° C., especially 100 to 280° C., preferably from 150 to 250° C. Suitable aprotic polar solvents are, for example, high-boiling ethers, esters, ketones, asymmetrically halogenated hydrocarbons, anisole, dimethylformamide, dimethyl sulfoxide, sulfolane, N-methyl-2-pyrrolidone and/or N-ethyl-2-pyrrolidone. It is also possible to use mixtures of these solvents.

A preferred solvent is especially N-methyl-2-pyrrolidone and/or N-ethyl-2-pyrrolidone.

Preferably, the starting compounds (M1) and (M2) and hydrophilic-hydrophobic blocks are reacted in the aprotic polar solvents (L) mentioned, especially N-methyl-2-pyrrolidone.

In a preferred embodiment the starting compounds (M1) and (M2) and hydrophilic-hydrophobic blocks are reacted in the presence of a base (B). The bases are preferably anhydrous. Suitable bases are especially anhydrous alkali metal and/or alkaline earth metal carbonate, preferably sodium carbonate, potassium carbonate, calcium carbonate or mixtures thereof, very particular preference being given to potassium carbonate, especially potassium carbonate with a volume-weighted mean particle size of less than 200 micrometers, determined with a particle size measuring instrument in a suspension of N-methyl-2-pyrrolidone.

A particularly preferred combination is N-methyl-2-pyrrolidone as solvent (L) and potassium carbonate as base (B).

The reaction of the suitable starting compounds (M1) and (M2) and hydrophilic-hydrophobic blocks is performed at a temperature of 80 to 250° C., preferably 100 to 220° C., the upper temperature limit being determined by the boiling point of the solvent.

The reaction is effected preferably within a time interval of 2 to 12 h, especially of 3 to 8 h.

Especially suitable starting materials, bases, solvents, ratios of all components involved, reaction times and reaction parameters like temperatures and pressures as well as suitable workup procedures are for example disclosed in U.S. Pat. No. 4,870,153, col. 4, ln. 11 to col. 17, ln. 64, EP 113 112, p. 6, ln. 1 to p. 9, ln. 14, EP-A 297 363, p. 10, ln. 38 to p. 11, ln. 24, EP-A 135 130, p. 1, ln. 37 to p. 4, ln. 20, which are incorporated in this application by reference.

Hydrophilic-hydrophobic blocks comprised in copolymers according to the invention comprise polyisobutene blocks (PIB).

The polyisobutene blocks are composed substantially of isobutene units and are obtainable by polymerizing isobutene. The isobutene blocks may, however, also include initiators and, to a small extent, other comonomers as units. Units of this kind may be used in order to fine-tune the properties of the block. Comonomers for mention, besides 1-butene and cis- and/or trans-2-butene, include, in particular, isoolefins having 5 to 10 carbon atoms such as 2-methyl-1-bute-1-ene, 2-methyl-1-pentene, 2-methyl-1-hexene, 2-ethyl-1-pentene, 2-ethyl-1-hexene, and 2-propyl-1-heptene, or vinylaromatics such as styrene and α-methylstyrene, $C_1$-$C_4$ alkylstyrenes such as 2-, 3- and 4-methylstyrene and 4-tert-butylstyrene. The fraction of such comonomers ought not, however, to be too great. As a general rule their amounts should not exceed 20% by weight, based on the amount of all units in the block. Besides the isobutene units and comonomers the blocks may also comprise the starter molecules used at the start of the polymerization, or fragments thereof. The polyisobutenes thus prepared may be linear, branched or star-shaped. They may contain functional groups only at one chain end or else at two or more chain ends.

Suitable polyisobutene blocks are functionalized polyisobutenes. Functionalized polyisobutenes can be prepared starting from reactive polyisobutenes by providing them with functional groups in single-stage or multistage reactions known in principle to the skilled worker. By reactive polyisobutene the skilled worker understands polyisobutene which has a very high fraction of terminal α-olefin end groups. The preparation of reactive polyisobutenes is likewise known and described, for example, in detail in the already cited texts WO 04/9654, pages 4 to 8, or in WO 04/35635, pages 6 to 10.

Preferred embodiments of the functionalization of reactive polyisobutene comprise:

i) reacting aromatic hydroxy compounds in the presence of an alkylating catalyst to give aromatic hydroxy compounds alkylated with polyisobutenes, ii) reacting the polyisobutene block with a peroxy compound to give an epoxidized polyisobutene, iii) reacting the polyisobutene block with an alkene containing a double bond substituted by electron-withdrawing groups (enophile), in an ene reaction, iv) reacting the polyisobutene block with carbon monoxide and hydrogen in the presence of a hydroformylation catalyst to give a hydroformylated polyisobutene, v) reacting the polyisobutene block with a phosphorus halide or a phosphorus oxychloride to give a polyisobutene functionalized with phosphonic groups, vi) reacting the polyisobutene block with a borane, followed by oxidative cleavage, to give a hydroxylated polyisobutene, vii) reacting the polyisobutene block with an $SO_3$ source, preferably acetyl sulfate or oleum, to give a polyisobutene containing terminal sulfonic acid groups, viii) reacting the polyisobutene block with oxides of nitrogen, followed by hydrogenation, to give a polyisobutene containing terminal amino groups.

For all details for implementing the stated reactions we refer to the statements in WO 04/35635, pages 11 to 27.

In one embodiment, preference is given to embodiment iii). With particular preference maleic anhydride is used for the reaction in that case. This results in polyisobutenes functionalized with succinic anhydride groups (polyisobutenylsuccinic anhydride, PIBSA).

In a particularly preferred embodiment, suitable hydrophilic-hydrophobic blocks comprise polyisobutene blocks that are obtained by functionalization of reactive polyisobutene in a reaction with aromatic hydroxy compounds in the presence of an alkylating catalyst to give aromatic hydroxy compounds alkylated with polyisobutenes.

In one embodiment isobutene or an isobutene-containing monomer mixture is polymerized in the presence of a Lewis acid and of an initiator and the polymerization is terminated with a mixture of at least one phenol and at least one Lewis acid and/or at least one Brønsted acid and the terminal phenol groups are optionally derivatized or reduced to cyclohexanol systems. Hereby, isobutene polymers comprising phenol groups at the chain end(s) are obtainable. The terminal phenol groups are then derivatized, for example etherified. In one embodiment, terminal phenol groups can be converted, for example reduced to cyclohexanol systems prior to the derivatization.

Hereinafter, "derivatized" or "derivatives" is understood to mean that, rather than the hydrogen atom of the OH group of at least one of the terminal phenol groups, another atom or another atom group is present.

Suitable initiators are in principle all organic compounds which have at least one nucleophilically displaceable leaving group X and which can stabilize a positive charge or partial charge on the carbon atom which bears the leaving group X. These are known to include compounds having at least one leaving group X bonded to a secondary or tertiary aliphatic carbon atom or to an allylic or benzylic carbon atom. Useful leaving groups include halogen, alkoxy, preferably $C_1$-$C_6$-alkoxy, and acyloxy (alkylcarbonyloxy), preferably $C_1$-$C_6$-alkylcarbonyloxy.

Halogen here represents especially chlorine, bromine or iodine and specifically chlorine. $C_1$-$C_6$-Alkoxy may be either linear or branched, and is, for example, methoxy, ethoxy, n-propoxy, isopropoxy, n-butoxy, isobutoxy, n-pentoxy and n-hexoxy, especially methoxy. $C_1$-$C_6$-Alkylcarbonyloxy is, for example, acetoxy, propionyloxy, n-butyroxy and isobutyroxy, especially acetoxy.

Preference is given to those initiators in which the functional group has the general formula FG

in which
X is selected from halogen, $C_1$-$C_6$-alkoxy and $C_1$-$C_6$-acyloxy,
$R^a$ is hydrogen or methyl and
$R^b$ is methyl or forms a $C_5$-$C_6$-cycloalkyl ring with $R^a$ or the molecular moiety to which the functional group FG is bonded, and $R^b$ may also be hydrogen when the functional group FG is bonded to an aromatic or olefinically unsaturated carbon atom.

The initiators preferably have one, two, three or four and particularly one or two functional groups FG, and specifically one functional group FG. Preferably, X in formula (FG) is a halogen atom, especially chlorine.

Preferred initiators correspond, for example, to the general formulae I-A to I-F:

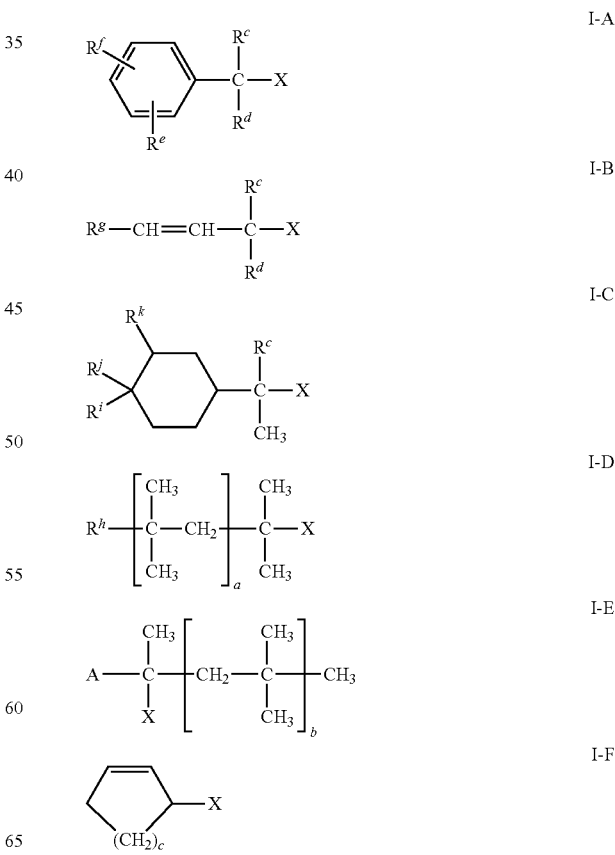

in which X is as defined above;
a and b are each independently 0, 1, 2, 3, 4 or 5;
c is 1, 2 or 3;
$R^c$, $R^d$ and $R^j$ are each independently hydrogen or methyl;
$R^e$, $R^f$ and $R^g$ are each independently hydrogen, $C_1$-$C_4$-alkyl or a $CR^cR^d$—X group in which $R^c$,
$R^d$ and X are each as defined above;
$R^h$ is hydrogen, methyl or an X group;
$R^i$ and $R^k$ are each hydrogen or an X group; and
A is an ethylenically unsaturated hydrocarbonyl radical having a vinyl group or a cycloalkenyl group.

In the formulae I-A to I-C, $R^c$ and $R^d$ are preferably both methyl. In the formula I-A, $R^f$ is, for example, a $CR^cR^d$—X group arranged in the para or meta position to the $CR^cR^d$X-group, especially when $R^e$ is hydrogen. It may also be in the meta position when the $R^e$ group is $C_1$-$C_4$-alkyl or a $CR^cR^d$—X group. Preferred compounds I-A are, for example: 2-chloro-2-phenylpropane and 1,4-bis(2-chloro-2-propyl)benzene (1,4-dicumyl chloride, 1,4-DCC) or 1,3-bis(2-chloro-2-propyl)benzene (1,3-dicumyl chloride, 1,3-DCC).

Examples of compounds of the formula I-B are allyl chloride, methallyl chloride, 2-chloro-2-methyl-2-butene and 2,5-dichloro-2,5-dimethyl-3-hexene.

In the compounds I-C, $R^c$ is preferably methyl. $R^i$ is preferably an X group, and especially halogen, especially when $R^j$ is methyl.

Examples of compounds of the general formula I-C are 1,8-dichloro-4-p-menthane (limonene dihydrochloride), 1,8-dibromo-4-p-menthane (limonene dihydrobromide), 1-(1-chloroethyl)-3-chlorocyclohexane, 1-(1-chloroethyl)-4-chlorocyclohexane, 1-(1-bromoethyl)-3-bromocyclohexane and 1-(1-bromoethyl)-4-bromocyclohexane.

Among the compounds of the formula I-D preference is given to those in which $R^h$ is a methyl group. Preference is also given to compounds of the general formula I-D in which $R^h$ is an X group, and especially a halogen atom, when a>0.

In compounds I-E, A is a hydrocarbonyl radical having generally 2 to 21 carbon atoms, which has either a vinyl group ($CH_2$=CH—) or a $C_5$-$C_8$-cycloalkenyl radical, e.g. cyclopenten-3-yl, cyclopenten-4-yl, cyclohexen-3-yl, cyclohexen-4-yl, cyclohepten-3-yl, cyclohepten-4-yl, cycloocten-3-yl, cycloocten-4-yl or cycloocten-5-yl.

Preferably, A is a radical of the formula A.1, A.2 or A.3

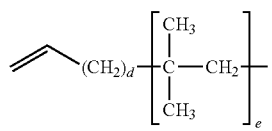

A.1

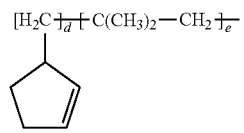

A.2

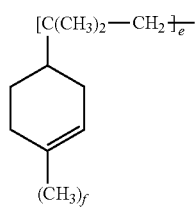

A.3 in which
d is 0 or 1;
e is a number from 0 to 3, especially 0, 1 or 2, and
f is 0 or 1.

In compounds I-E where A=A.2, d is preferably 1.

In compounds I-E where A=A.3, e is preferably 0. f is preferably 1. Examples of initiator compounds I-E are 2-chloro-2-methyl-3-butene, 2-chloro-2-methyl-4-pentene, 2-chloro-2,4,4-trimethyl-5-hexene, 2-chloro-2-methyl-3-(cyclopenten-3-yl)propane, 2-chloro-2-methyl-4-(cyclohexen-4-yl)pentane and 2-chloro-2-(1-methylcyclohexen-4-yl)propene.

In compounds of the formula I-F, X is preferably chlorine. c is preferably 1 or 2 and more preferably 1. A preferred compound of the formula I-F is 3-chlorocyclopentene.

Particular preference is given to using initiators of the formula I-A or I-D and especially those of the formula I-D.

The above-described initiators and processes for preparation thereof are known and are described, for example, in WO 02/48215, WO 03/074577 and WO 2004/113402, which are hereby fully incorporated by reference.

Useful Lewis acids for triggering the polymerization include covalent metal halides and semimetal halides which have a vacancy for an electron pair. Such compounds are known to those skilled in the art, for example from J. P. Kennedy et al. in U.S. Pat. No. 4,946,889, U.S. Pat. No. 4,327,201, U.S. Pat. No. 5,169,914, EP-A 206 756, EP-A 265 053, and also comprehensively in J. P. Kennedy, B. Ivan, "Designed Polymers by Carbocationic Macromolecular Engineering", Oxford University Press, New York, 1991. They are generally selected from halogen compounds of titanium, of tin, of aluminum, of vanadium or of iron, and also the halides of boron. Preference is given to the chlorides, and in the case of aluminum also to the monoalkylaluminum dichlorides and the dialkylaluminum chlorides. Preferred Lewis acids are titanium tetrachloride, boron trichloride, boron trifluoride, tin tetrachloride, aluminum trichloride, vanadium pentachloride, iron trichloride, alkylaluminum dichlorides and dialkylaluminum chlorides. Particularly preferred Lewis acids are titanium tetrachloride, boron trichloride and boron trifluoride, and especially titanium tetrachloride.

It has been found to be useful to perform the polymerization in the presence of an electron donor. Useful electron donors include aprotic organic compounds which have a free electron pair on a nitrogen, oxygen or sulfur atom. Preferred donor compounds are selected from pyridines such as pyridine itself, 2,6-dimethylpyridine, and also sterically hindered pyridines such as 2,6-diisopropylpyridine and 2,6-di-tert-butylpyridine; amides, especially N,N-dialkylamides of aliphatic and aromatic carboxylic acids such as N,N-dimethylacetamide; lactams, especially N-alkyl lactams such as N-methylpyrrolidone; ethers, for example dialkyl ethers such as diethyl ether and diisopropyl ether, cyclic ethers such as tetrahydrofuran; amines, especially trialkylamines such as triethylamine; esters, especially $C_1$-$C_4$-alkyl esters of aliphatic $C_1$-$C_6$-carboxylic acids, such as ethyl acetate; thioethers, especially dialkyl thioethers or alkylaryl thioethers, such as methyl phenyl sulfide; sulfoxides, especially dialkyl sulfoxides, such as dimethyl sulfoxide; nitriles, especially alkyl nitriles such as acetonitrile and propionitrile; phosphines, especially trialkylphosphines or triarylphosphines, such as trimethylphosphine, triethylphosphine, tri-n-butylphosphine and triphenylphosphine, and unpolymerizable aprotic organosilicon compounds which have at least one organic radical bonded via oxygen.

Among the aforementioned donors, preference is given to pyridine and sterically hindered pyridine derivatives and especially to organosilicon compounds.

Preferred organosilicon compounds of this type are those of the general formula XI:

$$R^a_r Si(OR^b)_{4-r} \quad (XI)$$

in which r is 1, 2 or 3,
$R^a$ may be the same or different and are each independently $C_1$-$C_{20}$-alkyl, $C_3$-$C_7$-cycloalkyl, aryl or aryl-$C_1$-$C_4$-alkyl, where the three latter radicals may also have one or more $C_1$-$C_{10}$-alkyl groups as substituents, and
$R^b$ are the same or different and are each $C_1$-$C_{20}$-alkyl, or, in the case that r is 1 or 2, two $R^b$ radicals together may be alkylene.

In the formula XI, r is preferably 1 or 2. $R^a$ is preferably a $C_1$-$C_8$-alkyl group, and especially a branched alkyl group or an alkyl group bonded via a secondary carbon atom, such as isopropyl, isobutyl, sec-butyl, or a 5-, 6- or 7-membered cycloalkyl group, or an aryl group, especially phenyl. The variable $R^b$ is preferably a $C_1$-$C_4$-alkyl group, or a phenyl, tolyl or benzyl radical.

Examples of preferred compounds of this type are dimethoxydiisopropylsilane, dimethoxyisobutylisopropylsilane, dimethoxydiisobutylsilane, dimethoxydicyclopentylsilane, dimethoxyisobutyl-2-butylsilane, diethoxyisobutylisopropylsilane, triethoxytolylsilane, triethoxybenzylsilane and triethoxyphenylsilane.

In the context of the present invention, $C_1$-$C_4$-alkyl represents a branched or linear alkyl radical, such as methyl, ethyl, propyl, isopropyl, n-butyl, sec-butyl, isobutyl or tert-butyl. $C_1$-$C_8$-Alkyl is additionally pentyl, hexyl, heptyl, octyl and the positional isomers thereof. $C_1$-$C_{20}$-Alkyl is additionally nonyl, decyl, undecyl, dodecyl, tridecyl, tetradecyl, pentadecyl, hexadecyl, heptadecyl, octadecyl, nonadecyl, eicosyl and the positional isomers thereof.

$C_3$-$C_7$-Cycloalkyl is, for example, cyclopropyl, cyclopentyl, cyclohexyl, cycloheptyl and cyclooctyl.

Aryl is especially phenyl, naphthyl or tolyl.

Aryl-$C_1$-$C_4$-alkyl is especially benzyl or 2-phenylethyl.

Alkylene is, for example, $C_2$-$C_5$-alkylene such as 1,2-ethylene, 1,2- and 1,3-propylene, 1,4-butylene and 1,5-pentylene.

The Lewis acid is used in an amount sufficient to form the initiator complex. The molar ratio of Lewis acid to initiator compound I is generally 10:1 to 1:10, particularly 1:1 to 1:4 and especially 1:1 to 1:2.5.

The Lewis acid and the electron donor are preferably used in a molar ratio of 20:1 to 1:20, more preferably of 5:1 to 1:5 and especially of 2:1 to 1:2.

The concentration of Lewis acid in the reaction mixture is typically in the range from 0.1 to 200 g/l and especially in the range from 1 to 50 g/l.

Suitable isobutene feedstocks of the process according to the invention are both isobutene itself and isobutene-containing $C_4$ hydrocarbon streams, for example $C_4$ raffinates, $C_4$ cuts from isobutene dehydrogenation, $C_4$ cuts from steamcrackers, FCC crackers (FCC: Fluid Catalyzed Cracking), provided that they have been substantially freed of 1,3-butadiene present therein. $C_4$ hydrocarbon streams suitable in accordance with the invention comprise generally less than 500 ppm, preferably less than 200 ppm, of butadiene. In the case of use of $C_4$ cuts as starting material, the hydrocarbons other than isobutene assume the role of an inert solvent.

It is also possible to react monomer mixtures of isobutene with olefinically unsaturated monomers copolymerizable with isobutene under cationic polymerization conditions. The process according to the invention is also suitable for block copolymerization of isobutene with ethylenically unsaturated comonomers polymerizable under cationic polymerization conditions. If monomer mixtures of isobutene with suitable comonomers are to be copolymerized, the monomer mixture comprises preferably more than 80% by weight, especially more than 90% by weight and more preferably more than 95% by weight of isobutene, and less than 20% by weight, preferably less than 10% by weight and especially less than 5% by weight of comonomers.

As copolymerizable monomers come vinylaromatics such as styrene and α-methylstyrene, C1-$C_4$-alkylstyrenes such as 2-, 3- and 4-methylstyrene, and also 4-tert-butylstyrene, isoolefines having 5 to 10 carbon atoms such as 2-methyl-1-butene, 2-methyl-1-pentene, 2-methyl-1-hexene, 2-ethyl-1-pentene, 2-ethyl-1-hexene and 2-propyl-1-heptene. Useful comonomers additionally include olefins having a silyl group, such as 1-trimethoxysilylethene, 1-(trimethoxysilyl) propene, 1-(trimethoxysilyl)-2-methyl-2-propene, 1-[tri (methoxyethoxy)silyl]ethene, 1-[tri(methoxyethoxy)silyl] propene, and 1-[tri(methoxyethoxy)silyl]-2-methyl-2-propene.

The polymerization is typically performed in a solvent. Useful solvents include all low molecular weight organic compounds or mixtures thereof which have a suitable dielectric constant and no abstractable protons and which are liquid under the polymerization conditions. Preferred solvents are hydrocarbons, for example acyclic hydrocarbons having 2 to 8 and preferably 3 to 8 carbon atoms, such as ethane, iso- and n-propane, n-butane and isomers thereof, n-pentane and isomers thereof, n-hexane and isomers thereof, n-heptane and isomers thereof, and noctane and isomers thereof, cyclic alkanes having 5 to 8 carbon atoms, such as cyclopentane, methylcyclopentane, cyclohexane, methylcyclohexane, cycloheptane, acyclic alkenes having preferably 2 to 8 carbon atoms, such as ethene, iso- and n-propene, n-butene, n-pentene, n-hexene and n-heptene, cyclic olefins such as cyclopentene, cyclohexene and cycloheptene, aromatic hydrocarbons such as toluene, xylene, ethylbenzene, and halogenated hydrocarbons such as halogenated aliphatic hydrocarbons, for example such as chloromethane, dichloromethane, trichloromethane, chloroethane, 1,2-dichloroethane and 1,1,1-trichloroethane and 1-chlorobutane, and also halogenated aromatic hydrocarbons such as chlorobenzene and fluorobenzene. The halogenated hydrocarbons used as solvents do not comprise any compounds in which halogen atoms are present on secondary or tertiary carbon atoms.

Preferred solvents are aromatic hydrocarbons, among which toluene is particularly preferred. Likewise preferred are solvent mixtures comprising at least one halogenated hydrocarbon and at least one aliphatic or aromatic hydrocarbon. More particularly, the solvent mixture comprises hexane and chloromethane and/or dichloromethane. The volume ratio of hydrocarbon to halogenated hydrocarbon is preferably in the range from 1:10 to 10:1, more preferably in the range from 4:1 to 1:4 and especially in the range from 2:1 to 1:2.

Preference is also given to chlorinated hydrocarbons whose polarity allows polymerization in a homogeneous solvent. Examples are the propyl, butyl and pentyl chlorides, such as 1-chlorobutane and 2-chloropropane.

In general, processes for making polyisobutene are performed at temperatures below 0° C., for example in the range from 0 to −140° C., preferably in the range from −30 to −120° C. and more preferably in the range from −40 to −110° C., i.e. at about −45° C., about −50° C. or in the range of −30° C.-−80° C. A range from 0 to −30° C. can be achieved by means of standard ammonia cooling and is therefore particularly simple to achieve and particularly preferred. The reaction pressure is of minor importance.

The heat of reaction is removed in a customary manner, for example by wall cooling and/or with exploitation of evaporative cooling.

To terminate the reaction and functionalize the polyisobutene, the living chain ends are preferably deactivated by addition of a mixture of at least one phenol (V) and at least one Lewis acid and/or at least one Brønsted acid,

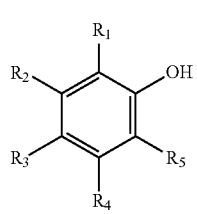

(V)

in which $R_1$, $R_2$, $R_3$, $R_4$, $R_5$ are the same or different and are each hydrogen, alkyl or alkoxy, with the proviso that at least one radical in an ortho or para position to the OH group is hydrogen. When one or more of the $R_1$, $R_2$, $R_3$, $R_4$, $R_5$ radicals are alkyl, this is a saturated, cyclic, linear or branched hydrocarbyl radical which typically has 1 to 20, frequently 1 to 10 and especially 1 to 4 carbon atoms and which is, for example, methyl, ethyl, n-propyl, isopropyl, n-butyl, sec-butyl, isobutyl, tert-butyl, n-pentyl, 2-pentyl, 3-pentyl, 2-methylbutyl, 3-methylbutyl, 3-methylbut-2-yl, 2-methylbut-2-yl, 2,2-dimethylpropyl, n-hexyl, 2-hexyl, 3-hexyl, 2-methylpentyl, 2-methylpent-3-yl, 2-methylpent-2-yl, 2-methylpent-4-yl, 3-methylpent-2-yl, 3-methylpent-3-yl, 3-methylpentyl, 2,2-dimethylbutyl, 2,2-dimethylbut-3-yl, 2,3-dimethylbut-2-yl, 2,3- or dimethylbutyl.

When one or more of the $R_1$, $R_2$, $R_3$, $R_4$, $R_5$ radicals are alkoxy, it is a saturated, cyclic, linear or branched hydrocarbyl radical which has typically 1 to 20, frequently 1 to 10 and especially 1 to 4 carbon atoms and is bonded to the phenol ring via an oxygen atom. Examples are the abovementioned hydrocarbyl radicals joined by an oxygen atom.

Useful Lewis acids include the Lewis acids described above for the polymerization, and forms such as $BF_3$, $BCl_3$, $SnCl_4$, $TiCl_4$, $AlCl_3$ are industrially readily obtainable and thus advantageous.

With Al-containing Lewis acids, high conversions are obtained, and $AlCl_3$ is particularly preferred.

Useful Brønsted acids include strong organic acids or superacids, for example trifluoromethanesulfonic acid, methanesulfonic acid, trifluoroacetic acid, trichloroacetic acid.

The mixture can also be used in a solvent. For the selection thereof, the considerations made for the solvent in the polymerization apply. Preferred, particularly simple processes are arrived at when the same solvent is used for the polymerization and the termination mixture.

After the termination, the solvent is generally removed in suitable units such as rotary evaporators, falling-film evaporators or thin-film evaporators, or by decompression of the reaction solution, or further conversions are conducted in the same solvent.

In one embodiment of processes for making polyisobutene, the polymerization is performed batchwise, i.e. as a batch reaction. For this purpose, for example, isobutene can be initially charged in a solvent, initiator and optionally further additions such as siloxanes can be added, and the reaction can be started with a Lewis acid. It is likewise possible to initially charge solvent, initiator, Lewis acid and optionally further additions such as siloxanes, and to control the reaction by continuous addition of isobutene. In all cases, the reaction temperature will be kept within the desired range by suitable cooling measures. A particular challenge in the polymerization arises from the high heat of reaction obtained within a short period. Part of the object of the present invention was therefore to provide a process which permits control of the rapid release of heat from the reaction. Especially polymerizations conducted on the industrial scale, given relatively large amounts converted, constitute a challenge in terms of the rapid heat release which occurs. Part of the object of the invention was therefore to provide a process which permits performance of reactions on the industrial scale.

In order to achieve relatively high molecular weights in a living cationic polymerization, it is necessary to achieve good temperature control via the removal of heat in continuous polymerization processes.

Accordingly, reactors having high heat transfer areas based on the reaction volume are an option. These may, as well as tubular reactors, also be reactors having rectangular channels, stirred tank reactors or particular micro- or milli-reactors. Micro- or milli-reactors allow good temperature control even in the case of strongly exothermic reactions. By virtue of the relatively large ratio of surface area to reactor volume, for example, very good heat supply and removal is enabled, and even strongly exothermic reactions can therefore be performed virtually isothermally. In addition, especially milli-reactors, due to their design, have good upscalability to the industrial scale.

In another embodiment, the polymerization is performed in a continuous process comprising at least the following steps:
(I) continuous metered addition of isobutene, solvent, initiator and optionally further additions to a mixer and mixing of the reactants in the mixing unit, and
(II) starting the continuous polymerization by continuous metered addition of a Lewis acid into a and mixing with the reactants at reaction temperature, and
(III) continuous polymerization by passing the resulting reaction mixture through at least one reaction zone under reaction conditions, and
(IV) terminating the reaction by means of a mixture of at least one phenol and at least one Lewis acid and/or at least one Brønsted acid.

In continuous mode, it is possible to adjust the reaction conditions after the initial addition of catalyst by metered addition of a further substance or of a substance mixture. For example, it is possible first to convert the initiator to the cationic complex and then to establish the conditions for the polymerization by addition of solvent and/or catalyst and/or cocatalyst and/or monomer.

The polymerization is preferably performed using milli-reactors. Milli-reactors differ from conventional apparatus by the characteristic dimension thereof. The characteristic dimension of a flow device, for example of a mixer or reactor, is understood in the context of the present invention to mean the smallest dimension at right angles to the flow direction. The characteristic dimension of milli-reactors is much smaller than that of conventional apparatus. It may especially be in the millimeter range. Compared to conventional reactors, milli-reactors therefore exhibit significantly different behavior in relation to the heat and mass transfer operations which proceed. By virtue of the relatively large ratio of surface area to reactor volume, for example, very good heat supply and removal is achieved, and even strongly endo- or exothermic reactions can therefore be performed virtually isothermally. Compared to micro-reactors, the characteristic dimensions of which are in the micrometer range, milli-reactors are less prone to blockage owing to the characteristic dimensions and thus have higher robustness with regard to industrial use.

Conventional reactors have a characteristic dimension of >30 mm, as opposed to ≤30 mm for milli-reactors. The characteristic dimension of a milli-reactor generally at most 30 mm, for example 0.1 to 30 mm or preferably 0.3 to 30 mm or more preferably 0.5 to 30 mm; preferably at most 20 mm, for example 0.1 to 20 mm or preferably 0.3 to 20 mm or more preferably 0.5 to 20 mm; more preferably at most 15 mm, for example 0.1 to 15 mm, or preferably 0.3 to 15 mm or more preferably 0.5 to 15 mm; even more preferably at most 10 mm, for example 0.1 to 10 mm or preferably 0.3 to 10 mm or more preferably 0.5 to 10 mm; even more preferably still at most 8 mm, for example 0.1 to 8 mm or preferably 0.3 to 8 mm or more preferably 0.5 to 8 mm; particularly at most 6 mm, for example 0.1 to 6 mm or preferably 0.3 to 6 mm or more preferably 0.5 to 6 mm; and especially at most 4 mm, for example 0.1 to 4 mm or preferably 0.3 to 4 mm or more preferably 0.5 to 4 mm.

Milli-reactors are preferably selected from temperature-controllable tubular reactors, shell and tube heat exchangers, plate heat exchangers and temperature-controllable tubular reactors with internals. Tubular reactors, shell and tube heat exchangers and plate heat exchangers for use in accordance with the invention have, as characteristic dimensions, tube or capillary diameters in the range from preferably 0.1 mm to 25 mm, more preferably in the range from 0.5 mm to 6 mm, even more preferably in the range from 0.7 mm to 5 mm and especially in the range from 0.8 mm to 4 mm, and layer heights or channel widths in the range from preferably 0.2 mm to 10 mm, more preferably in the range from 0.2 mm to 6 mm and especially in the range from 0.2 mm to 4 mm. Tubular reactors having internals for use in accordance with the invention have tube diameters in the range from 5 mm to 500 mm, preferably in the range from 8 mm to 200 mm and more preferably in the range from 10 mm to 100 mm. Alternatively, it is also possible in accordance with the invention to use flat channels which are comparable to plate apparatuses and have inlaid mixing structures. They have heights in the range from 1 mm to 20 mm and widths in the range from 10 mm to 1000 mm and especially in the range from 10 mm to 500 mm. Optionally, the tubular reactors may comprise mixing elements permeated by temperature control channels.

The optimal characteristic dimension is calculated here from the demands on the permissible anisothermicity of the reaction regime, the maximum permissible pressure drop and the propensity to blockage of the reactor.

Particularly preferred milli-reactors are:
tubular reactors composed of capillaries, capillary bundles with tube cross sections of 0.1 to 25 mm, preferably of 0.5 to 6 mm, more preferably of 0.7 to 4 mm, with or without additional mixing internals, it being possible for a temperature control medium to flow around the tubes or capillaries;
tubular reactors in which the heat carrier is conducted within the capillaries/tubes and the product whose temperature is to be controlled is conducted around the tubes and homogenized by internals (mixing elements);
plate reactors designed like plate heat exchangers with insulated parallel channels, networks of channels or areas equipped or not equipped with flow-disrupting internals (posts), the plates guiding product and heat carrier in parallel or in a layer structure having alternating heat carrier and product layers, such that chemical and thermal homogeneity can be ensured during the reaction; and
reactors with "flat" channel structures which have a "milli-dimension" only in terms of height and may have virtually any width, wherein the typical comb-shaped internals prevent the formation of flow profile and lead to a narrow residence time distribution which is important for the defined reaction regime and residence time.

In a preferred embodiment, at least one reactor which substantially has the residence time characteristics of plug flow is used. If plug flow is present in a tubular reactor, the state of the reaction mixture (e.g. temperature, composition etc.) may vary in flow direction, but the state of the reaction mixture is the same for each individual cross section at right angles to flow direction. Thus, all volume elements which enter the tube have the same residence time in the reactor. Viewed pictorially, the liquid flows through the tube as if it were a series of plugs sliding easily through the tube. In addition, the cross-mixing can balance out the concentration gradient at right angles to the flow direction through the intensified mass transfer at right angles to the flow direction.

In spite of the usually laminar flow through apparatuses having microstructures, it is thus possible to avoid back-mixing and achieve a narrow residence time distribution, similarly to the case of ideal flow tube.

The Bodenstein number is a dimensionless characteristic and describes the ratio of convection flow to dispersion flow (e.g. M. Baerns, H. Hofmann, A. Renken, Chemische Reaktionstechnik [Chemical Reaction Technology], Lehrbuch der Technischen Chemie [Textbook of Industrial Chemistry], volume 1, $2^{nd}$ edition, p. 332 ff). It thus characterizes the backmixing within a system.

$$Bo = \frac{uL}{D_{ax}}$$

where u is the flow rate [ms$^{-1}$], L is the length of reactor [m] and $D_{ax}$ is the axial coefficient of dispersion [m$^2$h$^{-1}$].

A Bodenstein number of zero corresponds to full backmixing in an ideal continuous stirred tank. An infinitely large Bodenstein number, in contrast, means absolutely no backmixing, as in the case of continuous flow through an ideal flow tube.

In capillary reactors, the desired backmixing characteristics can be established by adjusting the ratio of length to diameter as a function of the substance parameters and the flow state. The underlying calculation methods are known to those skilled in the art (e.g. M. Baerns, H. Hofmann, A. Renken: Chemische Reaktionstechnik, Lehrbuch der Technischen Chemie, volume 1, $2^{nd}$ edition, p. 339 ff). If minimum backmixing characteristics are to be implemented, the above-defined Bodenstein number selected is preferably greater than 10, more preferably greater than 20 and especially greater than 50. For a Bodenstein number of greater than 100, the capillary reactor then substantially has plug flow character.

Advantageous materials for the mixers and reactors to be used have been found to be stainless steels which are austenitic in the region of low temperatures, such as 1.4541 and 1.4571, generally known as V4A and as V2A respectively, and stainless steels of US types SS316 and SS317Ti. At relatively high temperatures and under corrosive conditions, polyether ketones are likewise suitable. However, it is also possible to use more corrosion-resistant Hastelloy® types, glass or ceramic as materials and/or corresponding coatings, for example TiN3, Ni-PTFE, NiPFA or the like for the reactors to be used in accordance with the invention.

The reactors are constructed such that the heat transfer areas are in very good contact with a temperature control medium, such that very good heat transfer is possible between the reaction mixture in the reaction zone and the temperature control medium, such that a substantially isothermal reaction regime is possible.

The temperature control medium should have sufficiently high heat capacity, should be circulated intensively and should be provided with a thermostat unit of sufficient power, and the heat transfer between the reaction zone and the temperature control medium should be as good as possible, in order to ensure a very substantially homogenous temperature distribution in the reaction zone.

For this purpose—according to the exothermicity and characteristic reaction time of the polymerization reaction—the ratio of heat exchange area to reaction volume should generally be between about 50 and about 5000 m²/m³, preferably between about 100 and about 3000 m²/m³, more preferably between about 150 and about 2000 m²/m³ and especially between about 200 and about 1300 m²/m³. Typically, the values for reactors having production capacities of about 5000 tonnes per year are in the region of about 200 m²/m³, for reactors having production capacities of about 500 tonnes per year in the region of about 500 m²/m³, and for reactors under the laboratory scale about 600 to 1300 m²/m³. In addition, the heat transfer coefficient on the part of the reaction medium should generally be more than 50 W/m²K, preferably more than 100 W/m²K, more preferably more than 200 W/m²K and especially more than 400 W/m²K.

The above described process is suitable for industrial production of polyisobutene derivatives in continuous and/or batchwise mode. In batchwise mode, this means batch sizes of more than 10 kg, better >100 kg, even more optimally >1000 kg or >5000 kg. In continuous mode, this means production volumes of more than 100 kg/day, better >1000 kg/day, even more optimally >10 t/day or >100 t/day.

Suitable isobutene blocks normally have a narrow molecular weight distribution. The polydispersity index $PDI=M_w/M_n$ is usually below 2.0, preferably below 1.60, more preferably below 1.40 and especially below 1.3. More particularly, the polymers prepared in accordance with the invention have a low level of high molecular weight by-products, which also becomes clear from a low ratio of $M_z/M_n$, which is usually below 2.0, preferably below 1.60, more preferably below 1.40 and especially below 1.20. (Test method for molecular weights: GPC analysis (polystyrene standard, result converted to polyisobutene, ERC-RI-101 detector, tetrahydrofuran eluent, flow rate: 1.2 ml/min))

Preferably, polyisobutene blocks have a number-average molecular weight $M_n$ of 200 to 100 000, more preferably of 800 to 50 000 and especially of 1500 to 15 000.

Preferred polyisobutene blocks are high molecular weight polyisobutenes, i.e. polyisobutenes having a number-average molecular weight Mn greater than 800, better greater than 3500, even better greater than 5000 or greater than 7000 and preferably greater than 12 000.

The functionality of suitable polyisobutenes (based on the optionally derivatized, terminal phenol groups) is preferably at least 80%, more preferably at least 90% and especially preferably at least 95%.

In a preferred embodiment, suitable hydrophilic-hydrophobic blocks comprise structural units according to formula VI

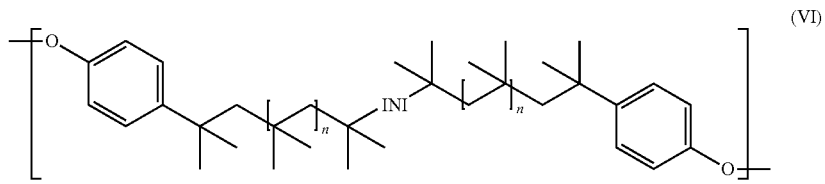

with INI being an initiator as defined above, preferably a divalent initiator;

n=2 to 1000, preferably 5 to 500, more preferably 10 to 300 and even more preferably 10 to 200.

Structural units according to formula VI are normally functionalized at their terminal positions with polyalkyleneoxides, as described below.

Structural units according to formula VI are normally included in said hydrophilic-hydrophobic blocks by using units according to formula VIa as starting materials, wherein the symbols used have the same meaning as in formula VI.

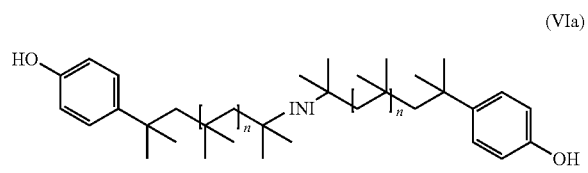

In a preferred embodiment, suitable hydrophilic-hydrophobic blocks comprise structural units according to formula I

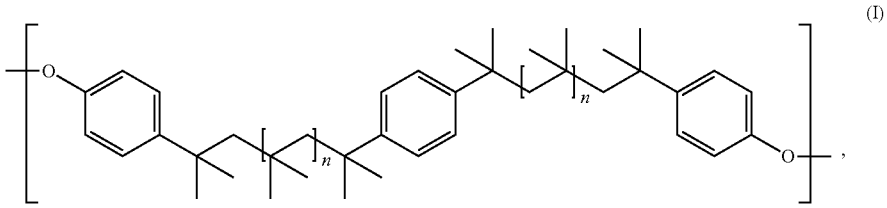

with n=2 to 1000, preferably 5 to 500, more preferably 10 to 300 and even more preferably 10 to 200.

Structural units according to formula I are normally functionalized at their terminal positions with polyalkyleneoxides, as described below.

Structural units according to formula I are normally included in said hydrophilic-hydrophobic blocks by using units according to formula Ia as starting materials, wherein the symbols used have the same meaning as in formula I.

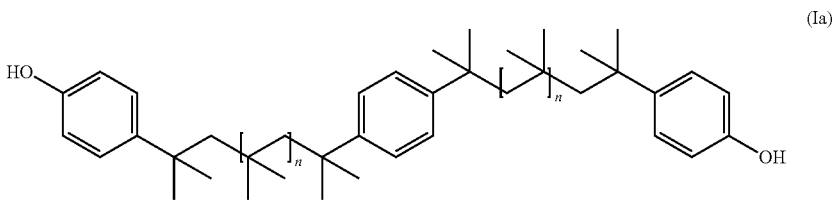

Suitable hydrophilic-hydrophobic blocks comprise functionalized polyisobutene blocks as well as a hydrophilic block.

Preferably hydrophilic-hydrophobic blocks comprise polyisobutene blocks with terminal ether groups.

In a preferred embodiment, suitable hydrophilic-hydrophobic blocks comprise polyisobutene blocks comprising terminal phenolic ether groups.

In a preferred embodiment, suitable hydrophilic-hydrophobic blocks comprise polyisobutene blocks with terminal phenolic ether groups and wherein said phenol groups are functionalized with polyalkyleneoxides. The latter form the hydrophilic blocks.

The hydrophilic blocks are preferably composed substantially of oxyalkylene units. Oxalkylene units are, in a way which is known in principle, units of the general formula —$R^1$—O—. In this formula $R^1$ is a divalent aliphatic hydrocarbon radical which may also, optionally, have further substituents. Additional substituents on the radical $R^1$ may comprise, in particular, O-containing groups, examples being OH groups. A hydrophilic block may of course also comprise two or more different oxyalkylene units.

The oxalkylene units may in particular be —$(CH_2)_2$—O—, —$(CH_2)_3$—O—, —$(CH_2)_4$—O—, —$CH_2$—CH($R^2$)—O—, —$CH_2$—CHOR$^3$—$CH_2$—O—, with $R^2$ being an alkyl group, especially $C_1$-$C_{24}$ alkyl, or an aryl group, especially phenyl, and $R^3$ being a group selected from the group consisting of hydrogen, $C_1$-$C_{24}$ alkyl, $R^1$—C(=O)—, and $R^1$—NH—C(=O)—.

The hydrophilic blocks may also comprise further structural units, such as ester groups, carbonate groups or amino groups, for example. They may additionally comprise the starter molecules used at the start of the polymerization, or fragments thereof. Examples comprise terminal groups $R^2$—O—, where $R^2$ is as defined above.

As a general rule the hydrophilic blocks comprise ethylene oxide units —$(CH_2)_2$—O— and/or propylene oxide units —$CH_2$—CH($CH_3$)—O, as main components, while higher alkylene oxide units, i.e. those having more than 3 carbon atoms, are present only in small amounts in order to fine-tune the properties. The blocks may be random copolymers, gradient copolymers, alternating or block copolymers comprising ethylene oxide and propylene oxide units. The amount of higher alkylene oxide units ought not to exceed 10% by weight, preferably 5% by weight. The blocks in question are preferably blocks comprising at least 50% by weight of ethylene oxide units, preferably 75% by weight, and more preferably at least 90% by weight of ethylene oxide units. With very particular preference the blocks in question are pure polyoxyethylene blocks.

The hydrophilic blocks are obtainable in a manner known in principle, for example, by polymerizing alkylene oxides and/or cyclic ethers having at least 3 carbon atoms and also, optionally, further components. They may additionally be prepared by polycondensing dialcohols and/or polyalcohols, suitable starters, and also, optionally, further monomeric components.

Examples of suitable alkylene oxides as monomers for the hydrophilic blocks comprise ethylene oxide and propylene oxide and also 1-butene oxide, 2,3-butene oxide, 2-methyl-1,2-propene oxide (isobutene oxide), 1-pentene oxide, 2,3-pentene oxide, 2-methyl-1,2-butene-oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, decene oxide, 4-methyl-1,2-pentene oxide, styrene oxide, or be formed from a mixture of oxides of industrially available raffinate streams. Examples of cyclic ethers comprise tetrahydrofuran. It is of course also possible to use mixtures of different alkylene oxides. The skilled worker makes an appropriate selection from among the monomers and further components in accordance with the desired properties of the block.

The hydrophilic blocks may also be branched or star-shaped. Blocks of this kind are obtainable by using starter molecules having at least 3 arms. Examples of suitable starters comprise glycerol, trimethylolpropane, pentaerythritol or ethylenediamine.

In one embodiment, polyalkylene oxide blocks are homopolymers of one alkylene oxide, preferably ethylene oxide.

The synthesis of alkylene oxide blocks is known to the skilled worker. Details are given, for example, in "Polyoxyalkylenes" in Ullmann's Encyclopedia of Industrial Chemistry, 6th Edition, Electronic Release.

The synthesis of the hydrophilic-hydrophobic blocks can in one embodiment be performed by first separately preparing the hydrophilic blocks and reacting them in a polymer-analogous reaction with the functionalized polyisobutenes to form the hydrophilic-hydrophobic block.

In a preferred embodiment, suitable hydrophilic-hydrophobic blocks are obtained by alkoxylation of phenol functionalized polyisobutene.

In one embodiment, the OH group of the phenol of the polyisobutenes terminated by a phenol derivative is activated. Suitable activation reagents are strong bases which convert the OH function to the phenoxide. Suitable reagents are, for example, sodium hydride, lithium hydride, potassium hydride, n-butyllithium, sec-butyllithium, isobutyllithium, tert-butyllithium, hexyllithium, methyllithium, sodium ethoxide, sodium butoxide, sodium amide, lithium diisopropylamide, or elemental sodium or potassium. These bases are used in solid form without solvents or as a solution or suspension with solvent. Suitable solvents are, for example, tetrahydrofuran, benzene, diethyl ether, paraffin oil.

Further suitable strong bases are, for example, sodium hydroxide, potassium hydroxide, calcium hydroxide, sodium carbonate. These bases are used in solid form or as an aqueous solution. Additionally with the aqueous system, phase transfer catalysts are used. Suitable catalysts are selected from the group of cations consisting of, for example, tetrabutylammonium, trimethyldodecylammonium, methyltrioctylammonium, heptyltributylammonium, tetrapropylammonium, tetrahexylammonium, tetraoctylammonium, tetradecylammonium, tetradodecylammonium, tetrabutylphosphonium, dodecyltrimethylphosphonium, and selected from the group of anions consisting of chloride, bromide, sulfates, hydrogensulfates, phosphates, hydrogenphosphates.

In a preferred embodiment, polyisobutene terminated by a phenol derivative is activated using an aqueous, basic solution (like an aqueous solution of alkali metal hydroxides like NaOH or KOH) while removing water from the mixture at elevated temperature (for example temperatures above 100° C.) and optionally under reduced pressure. The alkoxylation, preferably ethoxylation, is then carried out at elevated temperature (for example 100 to 150° C.) and under a pressure of at least 1 bar with preferably continuous addition of alkyleneoxide, preferably ethylene oxide. The basic reaction product is then neutralized using suitable acids like acetic acid or silicates and is then filtered.

In another embodiment, the alkoxylation, preferably ethoxylation, can be carried out using double metal cyanide (DMC) catalysts under otherwise identical conditions.

The mass of the polyakylene oxide blocks is adjusted by the molar ratio of phenol terminated polyisobutene and alkyleneoxide.

The molar mass of the hydrophilic blocks is set by the skilled worker in accordance with the desired application. In general the hydrophilic blocks each have an average molar mass $M_n$ of 150 to 20 000 g/mol. $M_n$ is preferably 200 to 18000, more preferably 500 to 15000 and even more preferably 1000 to 8000 g/mol.

Preferably, polyalkylene oxide blocks comprise 1 to 300, preferably 2 to 250, more preferably 3 to 200 and even more preferably 50 to 100 alkyleneoxide, preferably ethylene oxide units in polymerized form.

In a preferred embodiment, suitable hydrophilic-hydrophobic blocks are obtained in a process comprising the following steps a) polymerization of isobutene or an isobutene-containing monomer mixture in the presence of a Lewis acid and of an initiator, b) termination of the polymerization with a mixture of at least one phenol and at least one Lewis acid and/or at least one Brønsted acid and c) derivatization of the terminal phenol groups by alkoxylation.

In a preferred embodiment, suitable hydrophilic-hydrophobic blocks comprise blocks according to formula (VII)

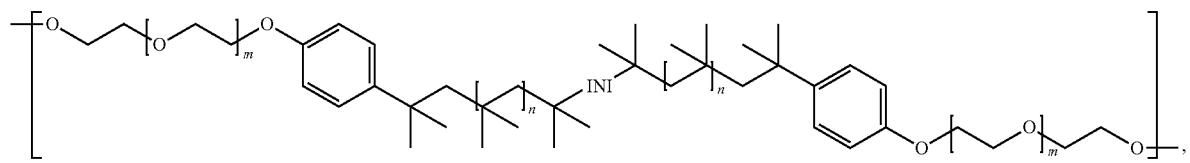

(VII)

wherein INI is an initiator as defined above, preferably a divalent initiator;

n=2 to 1000, preferably 5 to 500, more preferably 10 to 300 and even more preferably 10 to 200;

m=1 to 300, preferably 2 to 250, more preferably 3 to 200, even more preferably 5 to 100;

wherein said blocks are at least partly covalently bound to polyarylene ether blocks via the terminal OH groups.

When structural units according to formula VII form a terminal group of the block copolymer, the respective terminal group is normally bound to an H atom, forming a terminal OH-group. When structural units according to formula VII are bound to a polyaryl ether, said structural units according to formula VII are normally covalently bound to a polyarylene ether block via an ether group.

Structural units according to formula VII are normally included in said hydrophilic-hydrophobic blocks by using units according to formula VIIa as starting materials, wherein the symbols used have the same meaning as in formula VII.

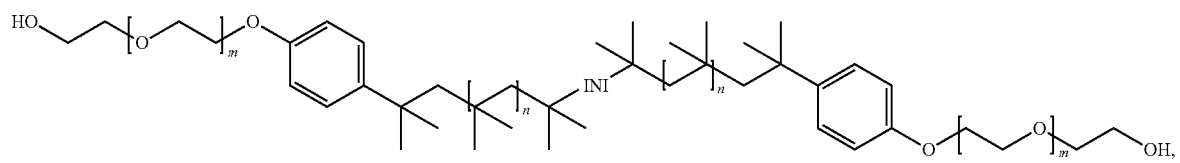

(VIIa)

In a preferred embodiment, suitable hydrophilic-hydrophobic blocks comprise blocks according to formula (II)

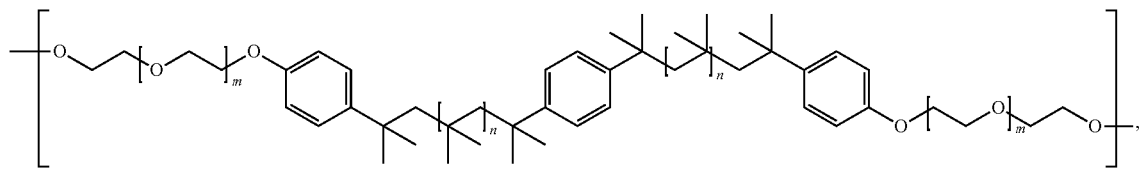

(II)

n=2 to 1000, preferably 5 to 500, more preferably 10 to 300 and even more preferably 10 to 200;

m=1 to 300, preferably 2 to 250, more preferably 3 to 200, even more preferably 5 to 100;

wherein said blocks are at least partly covalently bound to polyarylene ether blocks.

When structural units according to formula II form a terminal group of the block copolymer, the respective terminal group is normally bound to an H atom, forming a terminal OH-group. When structural units according to formula II are bound to a polyaryl ether, said structural units according to formula II are normally covalently bound to a polyarylene ether block via an ether group.

Structural units according to formula II are normally included in said block polymer blocks by using units according to formula IIa as starting materials, wherein the symbols used have the same meaning as in formula II.

Block copolymers according to the invention comprise hydrophilic-hydrophobic blocks and polyarylene ether blocks, wherein hydrophilic-hydrophobic blocks are covalently bound to the rest of said block copolymer. These blocks are bound to one another by means of suitable linking groups.

Normally, said hydrophilic-hydrophobic blocks are covalently bound to a polyarylene ether block via an ether group.

In preferred embodiments, polyarylene ether blocks in block copolymers are polysulfones, polyethersulfones or polyphenylenesulfones.

Usually, the average molecular weight Mw (determined by GPC according to the procedure given in the experimental section) of suitable block copolymers is 5000 to 150,000 g/mol, preferably 7500 to 125,000 g/mol, more preferably 10,000 to 100,000 g/mol.

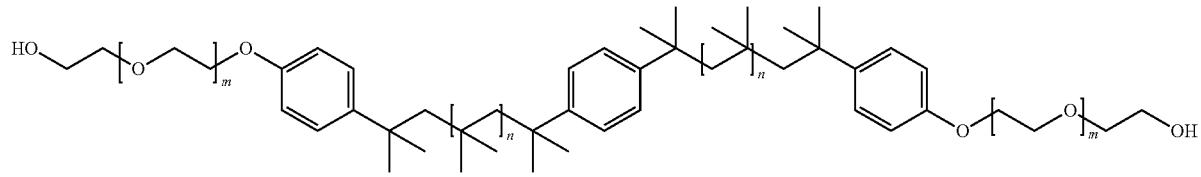

(IIa)

In a preferred embodiment, suitable copolymers have the general structure (VIII)

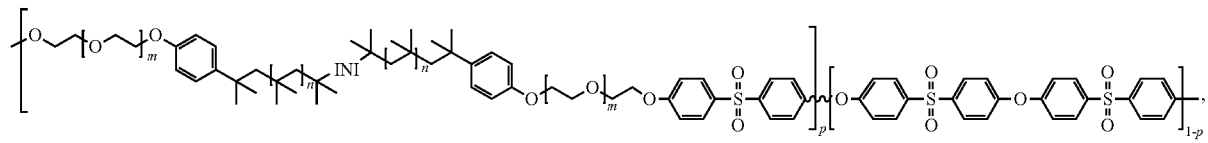

(VIII)

wherein

INI is an initiator as defined above, preferably a divalent initiator;

n=2 to 1000, preferably 5 to 500, more preferably 10 to 300 and even more preferably 10 to 200;

m=1 to 300, preferably 2 to 250, more preferably 3 to 200, even more preferably 5 to 100;

p=0.003 to 0.25.

A bond represented by the shape ⟿ (e.g. between the brackets in formula (VIII)) indicates that in formula (VIII) the terminal oxygen of the arylene ether block may be bound to the tail of another arylene ether block or to a block as represented by the left bracket with the index p in the above formula (VIII).

In a preferred embodiment, suitable copolymers have the general structure (III)

$$(III)$$

$$\left[ O \overset{}{\frown} O \overset{}{\frown}_m O \overset{}{-}\bigcirc\overset{}{-}\overset{|}{\underset{|}{C}}\overset{}{-}\bigcirc\overset{}{-}\overset{|}{\underset{|}{C}}\overset{}{-}\bigcirc\overset{}{-} O \overset{}{\frown} O \overset{}{\frown}_m O \overset{}{-}\bigcirc\overset{}{-}\overset{O}{\underset{O}{\overset{\|}{S}}}\overset{}{-}\bigcirc\overset{}{-}\right]_p \left[ O \overset{}{-}\bigcirc\overset{}{-}\overset{O}{\underset{O}{\overset{\|}{S}}}\overset{}{-}\bigcirc\overset{}{-} O \overset{}{-}\bigcirc\overset{}{-}\overset{O}{\underset{O}{\overset{\|}{S}}}\overset{}{-}\bigcirc\overset{}{-}\right]_{1-p},$$

wherein n=2 to 1000, preferably 5 to 500, more preferably 10 to 300 and even more preferably 10 to 200;

m=1 to 300, preferably 3 to 200, more preferably 5 to 100;

p=0.003 to 0.25.

Suitable block copolymers preferably have a polydispersity (Mw/Mn) from 1.5 to 5, more preferably 2 to 4 (determined by GPC according to the procedure given in the experimental section).

Normally, block copolymers according to the invention have a glass temperature of 100 to 220° C. In some cases, a second glass transition temperature of the polyisobutene block can also be detected below 0° C.

Block copolymers according to the invention have a high mechanical flexibility.

Furthermore, block copolymers according to the invention show a low contact angle when contacted with water. Typically, the contact angle of polymers according to the invention with water is 40 to 90° (determined according to the method described in the experimental part). Thus, block copolymers according to the invention are easily wettable with water.

Block copolymers according to the invention have a high glass transition temperature. Typically block copolymers according to the invention have a glass transition temperature above 100° C., preferably above 120° C., more preferably above 130° C.

Furthermore, block copolymers according to the invention have very good dimensional stabilities, high heat distortion resistance, good mechanical properties and good flame retardance properties and biocompatibility. They can be processed and handled at high temperatures, enabling the manufacture of products that are exposed to high temperatures and are for example subjected to disinfection using steam, water vapor or higher temperatures, for example above 100° C. or above 125° C.

Furthermore, block copolymers according to the invention can be produced efficiently with short reaction times and using simple equipment. They have high viscosity numbers and high molecular masses.

Block copolymers according to the invention are useful for making products with high requirements to their chemical and mechanical properties. Block copolymers according to the invention are for example useful for injection molding applications. Block copolymers according to the invention are particularly useful for making membranes.

Block copolymers according to the invention are useful for making membranes or the separating layer of membranes, especially in ultrafiltration, nanofiltration or microfiltration membranes.

In one embodiment, suitable block copolymers are used to make support layers, carrier materials, stabilizing layers or other parts of membranes, especially in reverse osmosis or forward osmosis membranes.

Another aspect of the present invention are processes for making block copolymers according to the invention.

In one less preferred embodiment of the invention, block copolymers according to the invention are prepared from readily prepared arylene ether blocks and suitable hydrophilic-hydrophobic blocks that are treated in a suitable solvent under suitable reaction conditions.

In a preferred embodiment of the invention, block copolymers according to the invention are prepared by preparing suitable polyarylene ethers in the presence of suitable, readily prepared hydrophilic-hydrophobic copolymers.

For example, block copolymers according to the invention can be prepared by reacting aromatic bishalogeno compounds and aromatic biphenols or salts thereof in the presence of at least one suitable base and in the presence of suitable hydrophilic-hydrophobic polymer.

Suitable bases for these processes are for example inorganic carbonates or hydroxides.

For example, block copolymers according to the invention can be prepared from the reaction of aromatic bishalogeno compounds and aromatic biphenols or salts thereof in the presence of suitable hydrophilic-hydrophobic blocks and in the presence of at least one alkali metal or ammonium carbonate or hydrogencarbonate in an aprotic solvent, as described U.S. Pat. No. 4,870,153, col. 4, ln. 11 to col. 17, ln. 64, EP 113 112, p. 6, ln. 1 to p. 9, ln. 14, EP-A 297 363, p. 10, ln 38 to p. 11, ln. 24, EP-A 135 130, p. 1, ln 37 to p. 4, ln. 20, which are incorporated in this application by reference.

Processes according to the invention allow the preparation of block copolymers according to the invention in a relatively short reaction time and with high purity.

Processes according to the invention allow the preparation of block copolymers according to the invention with a high molecular weight.

Processes according to the invention normally do not require any distillation steps or the use of entrainers.

Another aspect of the present invention are membranes comprising copolymers according to the invention.

In the context of this application a membrane shall be understood to be a thin, semipermeable structure capable of separating two fluids or separating molecular and/or ionic components or particles from a liquid. A membrane acts as a selective barrier, allowing some particles, substances or chemicals to pass through, while retaining others.

For example, membranes according to the invention can be reverse osmosis (RO) membranes, forward osmosis (FO) membranes, nanofiltration (NF) membranes, ultrafiltration (UF) membranes or microfiltration (MF) membranes. These membrane types are generally known in the art and are further described below.

FO membranes are normally suitable for treatment of seawater, brackish water, sewage or sludge streams. Thereby pure water is removed from those streams through a FO membrane into a so called draw solution on the back side of the membrane having a high osmotic pressure.

In a preferred embodiment, suitable FO membranes are thin film composite (TFC) FO membranes. Preparation methods and use of thin film composite membranes are principally known and, for example described by R. J. Petersen in Journal of Membrane Science 83 (1993) 81-150.

In a particularly preferred embodiment, suitable FO membranes comprise a fabric layer, a support layer, a separation layer and optionally a protective layer. Said protective layer can be considered an additional coating to smoothen and/or hydrophilize the surface.

Said fabric layer can for example have a thickness of 10 to 500 µm. Said fabric layer can for example be a woven or nonwoven, for example a polyester nonwoven.

Said support layer of a TFC FO membrane normally comprises pores with an average pore diameter of for example 0.5 to 100 nm, preferably 1 to 40 nm, more preferably 5 to 20 nm. Said support layer can for example have a thickness of 5 to 1000 µm, preferably 10 to 200 µm. Said support layer may for example comprise as the main component a polysulfone, polyethersulfone, polyphenylenesulfone, polyvinylidenedifluoride PVDF, polyimide, polyimideurethane or cellulose acetate.

In a preferred embodiment, FO membranes comprise a support layer comprising as the main component at least one block copolymer useful according to the invention.

In another embodiment, FO membranes comprise a support layer comprising as the main component at least one polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene (PTFE), Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone (PSU), polyphenylenesulfone (PPSU) or polyethersulfone (PESU) different from block copolymers as described above, or mixtures thereof in combination with suitable block copolymers according to the invention.

In another preferred embodiment, FO membranes comprise a support layer comprising as the main components at least one polysulfone, polyphenylenesulfone and/or polyethersulfone different from block copolymers described above in combination with suitable block copolymers according to the invention.

Nano particles such as zeolites, may be comprised in said support membrane. This can for example be achieved by including such nano particles in the dope solution for the preparation of said support layer.

Said separation layer of a FO membrane can for example have a thickness of 0.05 to 1 µm, preferably 0.1 to 0.5 µm, more preferably 0.15 to 0.3 µm. Preferably said separation layer can for example comprise polyamide or cellulose acetate as the main component.

Optionally, TFC FO membranes can comprise a protective layer with a thickness of 30-500 preferable 100-300 nm. Said protective layer can for example comprise polyvinylalcohol (PVA) as the main component. In one embodiment, the protective layer comprises a halamine like chloramine.

In one preferred embodiment, suitable membranes are TFC FO membranes comprising a support layer comprising block copolymers according to the invention, a separation layer comprising polyamide as main component and optionally a protective layer comprising polyvinylalcohol as the main component.

In a preferred embodiment suitable FO membranes comprise a separation layer obtained from the condensation of a polyamine and a polyfunctional acyl halide. Said separation layer can for example be obtained in an interfacial polymerization process.

RO membranes are normally suitable for removing molecules and ions, in particular monovalent ions. Typically, RO membranes are separating mixtures based on a solution/diffusion mechanism.

In a preferred embodiment, suitable membranes are thin film composite (TFC) RO membranes. Preparation methods and use of thin film composite membranes are principally known and, for example described by R. J. Petersen in Journal of Membrane Science 83 (1993) 81-150.

In a further preferred embodiment, suitable RO membranes comprise a fabric layer, a support layer, a separation layer and optionally a protective layer. Said protective layer can be considered an additional coating to smoothen and/or hydrophilize the surface Said fabric layer can for example have a thickness of 10 to 500 µm. Said fabric layer can for example be a woven or nonwoven, for example a polyester nonwoven.

Said support layer of a TFC RO membrane normally comprises pores with an average pore diameter of for example 0.5 to 100 nm, preferably 1 to 40 nm, more preferably 5 to 20 nm. Said support layer can for example have a thickness of 5 to 1000 µm, preferably 10 to 200 µm. Said support layer may for example comprise a main component a polysulfone, polyethersulfone, polyphenylenesulfone, PVDF, polyimide, polyimideurethane or cellulose acetate.

In a preferred embodiment, RO membranes comprise a support layer comprising as the main component at least one block copolymer useful according to the invention.

In another embodiment, RO membranes comprise a support layer comprising as the main component at least one polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene (PTFE), Poly(vinylidene fluoride) (PVDF), Polypropylene (PP), Polyelectrolyte complexes, Poly(m- ethyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone or polyethersulfone different from block copolymers according to the invention, or mixtures thereof in combination with block copolymers according to the invention.

In another preferred embodiment, RO membranes comprise a support layer comprising as the main component at least one polysulfone, polyphenylenesulfone and/or polyethersulfone different from block copolymers according to the invention in combination with block copolymers according to the invention.

Nano particles such as zeolites, may be comprised in said support membrane. This can for example be achieved by including such nano particles in the dope solution for the preparation of said support layer.

Said separation layer can for example have a thickness of 0.02 to 1 µm, preferably 0.03 to 0.5 µm, more preferably 0.05 to 0.3 µm. Preferably, said separation layer can for example comprise polyamide or cellulose acetate as the main component.

Optionally, TFC RO membranes can comprise a protective layer with a thickness of 5 to 500 preferable 10 to 300 nm. Said protective layer can for example comprise polyvinylalcohol (PVA) as the main component. In one embodiment, the protective layer comprises a halamine like chloramine.

In one preferred embodiment, suitable membranes are TFC RO membranes comprising a nonwoven polyester fabric, a support layer comprising block copolymers according to the invention, a separation layer comprising polyamide as main component and optionally a protective layer comprising polyvinylalcohol as the main component.

In a preferred embodiment suitable RO membranes comprise a separation layer obtained from the condensation of a polyamine and a polyfunctional acyl halide. Said separation layer can for example be obtained in an interfacial polymerization process.

Suitable polyamine monomers can have primary or secondary amino groups and can be aromatic (e.g. a diaminobenzene, a triaminobenzene, m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g. ethylenediamine, propylenediamine, piperazine, and tris(2-diaminoethyl)amine).

Suitable polyfunctional acyl halides include trimesoyl chloride (TMC), trimellitic acid chloride, isophthaloyl chloride, terephthaloyl chloride and similar compounds or blends of suitable acyl halides. As a further example, the second monomer can be a phthaloyl halide.

In one embodiment of the invention, a separation layer of polyamide is made from the reaction of an aqueous solution of meta-phenylene diamine MPD with a solution of trimesoyl chloride (TMC) in an apolar solvent.

NF membranes are normally especially suitable for removing multivalent ions and large monovalent ions. Typically, NF membranes function through a solution/diffusion or/and filtration-based mechanism.

NF membranes are normally used in crossflow filtration processes.

In one embodiment of the invention NF membranes comprise block copolymers according to the invention as the main component.

In another embodiment, NF membranes comprise as the main component at least one polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene (PTFE), Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone or polyethersulfone different from block copolymers according to the invention, or mixtures thereof in combination with block useful according to the invention.

In another embodiment of the invention, NF membranes comprise as the main component at least one polysulfone, polyphenylenesulfone and/or polyethersulfone different from block copolymers according to the invention in combination with block copolymers according to the invention.

In a particularly preferred embodiment, the main components of a NF membrane are positively or negatively charged.

Nanofiltration membranes often comprise charged polymers comprising sulfonic acid groups, carboxylic acid groups and/or ammonium groups in combination with block copolymers according to the invention.

In another embodiment, NF membranes comprise as the main component polyamides, polyimides or polyimide urethanes, Polyetheretherketone (PEEK) or sulfonated polyetheretherketone (SPEEK), in combination with block copolymers according to the invention.

UF membranes are normally suitable for removing suspended solid particles and solutes of high molecular weight, for example above 10000 Da. In particular, UF membranes are normally suitable for removing bacteria and viruses.

UF membranes normally have an average pore diameter of 2 nm to 50 nm, preferably 5 to 40 nm, more preferably 5 to 20 nm.

In one embodiment of the invention UF membranes comprise block copolymers according to the invention as the main component.

In another embodiment, UF membranes comprise as the main component at least one polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBI L), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone, or polyethersulfone different from block copolymers according to the invention, or mixtures thereof in combination with block copolymers according to the invention.

In another embodiment of the invention, UF membranes comprise as the main component at least one polysulfone, polyphenylenesulfone and/or polyethersulfone different from block copolymers according to the invention in combination with block copolymers according to the invention.

In one preferred embodiment, block copolymers according to the invention are used to make UF membranes, wherein block copolymers according to the invention are comprised in an amount from 1 to 100% by weight, preferably 5 to 95% by weight, more preferably 10 to 70 and especially preferably 15 to 50% by weight.

In one embodiment, UF membranes comprise further additives like polyvinyl pyrrolidones or polyalkylene oxides like polyethylene oxides.

In a preferred embodiment, UF membranes comprise as major components polysulfones, polyphenylenesulfone or polyethersulfone different from block copolymers according to the invention in combination with at least one block copolymer useful according to the invention and with further additives like polyvinylpyrrolidone.

In one preferred embodiment, UF membranes comprise 99.9 to 50% by weight of a combination of polyethersulfone different from block copolymers according to the invention and block copolymers according to the invention and 0.1 to 50% by weight of polyvinylpyrrolidone.

In another embodiment UF membranes comprise 95 to 80% by weight of polyethersulfone different from block copolymers according to the invention and block copolymers according to the invention and 5 to 15% by weight of polyvinylpyrrolidone.

In one embodiment of the invention, UF membranes are present as spiral wound membranes, as pillows or flat sheet membranes.

In another embodiment of the invention, UF membranes are present as tubular membranes.

In another embodiment of the invention, UF membranes are present as hollow fiber membranes or capillaries.

In yet another embodiment of the invention, UF membranes are present as single bore hollow fiber membranes.

In yet another embodiment of the invention, UF membranes are present as multibore hollow fiber membranes.

Multiple channel membranes, also referred to as multibore membranes, comprise more than one longitudinal channels also referred to simply as "channels".

In a preferred embodiment, the number of channels is typically 2 to 19. In one embodiment, multiple channel membranes comprise two or three channels. In another embodiment, multiple channel membranes comprise 5 to 9 channels. In one preferred embodiment, multiple channel membranes comprise seven channels.

In another embodiment the number of channels is 20 to 100.

The shape of such channels, also referred to as "bores", may vary. In one embodiment, such channels have an essentially circular diameter. In another embodiment, such channels have an essentially ellipsoid diameter. In yet another embodiment, channels have an essentially rectangular diameter.

In some cases, the actual form of such channels may deviate from the idealized circular, ellipsoid or rectangular form.

Normally, such channels have a diameter (for essentially circular diameters), smaller diameter (for essentially ellipsoid diameters) or smaller feed size (for essentially rectangular diameters) of 0.05 mm to 3 mm, preferably 0.5 to 2 mm, more preferably 0.9 to 1.5 mm. In another preferred embodiment, such channels have a diameter (for essentially circular diameters), smaller diameter (for essentially ellipsoid diameters) or smaller feed size (for essentially rectangular diameters) in the range from 0.2 to 0.9 mm.

For channels with an essentially rectangular shape, these channels can be arranged in a row.

For channels with an essentially circular shape, these channels are in a preferred embodiment arranged such that a central channel is surrounded by the other channels. In one preferred embodiment, a membrane comprises one central channel and for example four, six or 18 further channels arranged cyclically around the central channel.

The wall thickness in such multiple channel membranes is normally from 0.02 to 1 mm at the thinnest position, preferably 30 to 500 µm, more preferably 100 to 300 µm.

Normally, the membranes according to the invention and carrier membranes have an essentially circular, ellipsoid or rectangular diameter. Preferably, membranes according to the invention are essentially circular.

In one preferred embodiment, membranes according to the invention have a diameter (for essentially circular diameters), smaller diameter (for essentially ellipsoid diameters) or smaller feed size (for essentially rectangular diameters) of 2 to 10 mm, preferably 3 to 8 mm, more preferably 4 to 6 mm.

In another preferred embodiment, membranes according to the invention have a diameter (for essentially circular diameters), smaller diameter (for essentially ellipsoid diameters) or smaller feed size (for essentially rectangular diameters) of 2 to 4 mm.

In one embodiment the rejection layer is located on the inside of each channel of said multiple channel membrane In one embodiment, the channels of a multibore membrane may incorporate an active layer with a pore size different to that of the carrier membrane or a coated layer forming the active layer. Suitable materials for the coated layer are polyoxazoline, polyethylene glycol, polystyrene, hydrogels, polyamide, zwitterionic block copolymers, such as sulfobetaine or carboxybetaine. The active layer can have a thickness in the range from 10 to 500 nm, preferably from 50 to 300 nm, more preferably from 70 to 200 nm.

In one embodiment multi bore membranes are designed with pore sizes between 0.2 and 0.01 µm. In such embodiments the inner diameter of the capillaries can lie between 0.1 and 8 mm, preferably between 0.5 and 4 mm and particularly preferably between 0.9 and 1.5 mm. The outer diameter of the multi bore membrane can for example lie between 1 and 26 mm, preferred 2.3 and 14 mm and particularly preferred between 3.6 and 6 mm. Furthermore, the multi bore membrane can contain 2 to 94, preferably 3 to 19 and particularly preferred between 3 and 14 channels. Often multi bore membranes contain seven channels. The permeability range can for example lie between 100 and 10000 L/m²hbar, preferably between 300 and 2000 L/m²hbar.

Typically multi bore membranes of the type described above are manufactured by extruding a polymer, which forms a semi-permeable membrane after coagulation through an extrusion nozzle with several hollow needles. A coagulating liquid is injected through the hollow needles into the extruded polymer during extrusion, so that parallel continuous channels extending in extrusion direction are formed in the extruded polymer. Preferably the pore size on an outer surface of the extruded membrane is controlled by bringing the outer surface after leaving the extrusion nozzle in contact with a mild coagulation agent such that the shape is fixed without active layer on the outer surface and subsequently the membrane is brought into contact with a strong coagulation agent. As a result a membrane can be obtained that has an active layer inside the channels and an outer surface, which exhibits no or hardly any resistance against liquid flow. Herein suitable coagulation agents include solvents and/or non-solvents. The strength of the coagulations may be adjusted by the combination and ratio of non-solvent/solvent. Coagulation solvents are known to the person skilled in the art and can be adjusted by routine experiments. An example for a solvent based coagulation agent is N-methylpyrrolidone. Non-solvent based coagulation agents are for instance water, iso-propanol and propylene glycol.

MF membranes are normally suitable for removing particles with a particle size of 0.1 μm and above.

MF membranes normally have an average pore diameter of 0.05 μm to 10 μm, preferably 1.0 μm to 5 μm.

Microfiltration can use a pressurized system but it does not need to include pressure.

MF membranes can be capillaries, hollow fibers, flat sheet, tubular, spiral wound, pillows, hollow fine fiber or track etched. They are porous and allow water, monovalent species (Na+, Cl−), dissolved organic matter, small colloids and viruses through but retain particles, sediment, algae or large bacteria.

Microfiltration systems are designed to remove suspended solids down to 0.1 micrometers in size, in a feed solution with up to 2-3% in concentration.

In one embodiment of the invention MF membranes comprise block copolymers according to the invention as the main component.

In another embodiment, MF membranes comprise as the main component at least polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone or polyethersulfone different from block copolymers according to the invention, or mixtures thereof in combination with block copolymers according to the invention.

In another embodiment of the invention, MF membranes comprise as the main component at least one polysulfone, polyphenylenesulfone and/or polyethersulfone different from block copolymers according to the invention in combination with block copolymers according to the invention.

In one preferred embodiment, block copolymers according to the invention are used to make MF membranes, wherein block copolymers according to the invention are comprised in an amount from 1 to 100% by weight, preferably 5 to 95% by weight, more preferably 10 to 70 and especially preferably 15 to 50% by weight.

Membranes according to the invention have a high flexibility.

Furthermore, membranes according to the invention show a low contact angle when contacted with water. Thus, membranes according to the invention are easily wettable with water.

Membranes according to the invention have a high upper glass transition temperature. Membranes according to the invention are easy to make and to handle, are able to stand high temperatures and can for example be subjected to vapor sterilization.

Furthermore, membranes according to the invention have very good dimensional stabilities, high heat distortion resistance, good mechanical properties and good flame retardance properties and biocompatibility. They can be processed and handled at high temperatures, enabling the manufacture of membranes and membrane modules that are exposed to high temperatures and are for example subjected to disinfection using steam, water vapor or higher temperatures, for example above 100° C. of above 125° C.

Membranes according to invention show excellent properties with respect to the decrease of flux through a membrane over time and their fouling and biofouling properties.

Membranes according to the invention are easy and economical to make.

Filtration systems and membranes according to invention can be made using aqueous or alcoholic systems and are thus environmentally friendly. Furthermore, leaching of toxic substances is not problematic with membranes according to the invention.

Membranes according to the invention have a long lifetime.

Another aspect of the invention are membrane elements comprising a copolymer according to the invention.

A "membrane element", herein also referred to as a "filtration element", shall be understood to mean a membrane arrangement of at least one single membrane body. A filtration element can either be directly used as a filtration module or be included in a membrane module. A membrane module, herein also referred to as a filtration module, comprises at least one filtration element. A filtration module normally is a ready to use part that in addition to a filtration element comprises further components required to use the filtration module in the desired application, such as a module housing and the connectors. A filtration module shall thus be understood to mean a single unit which can be installed in a membrane system or in a membrane treatment plant. A membrane system herein also referred to as a filtration system is an arrangement of more than one filtration module that are connected to each other. A filtration system is implemented in a membrane treatment plant.

In many cases, filtration elements comprise more than one membrane arrangement and may further comprise more components like an element housing, one or more bypass tubes, one or more baffle plates, one or more perforated inner tubes or one or more filtrate collection tube. For hollow fiber or multibore membranes, for example, a filtration element normally comprises more than one hollow fiber or multibore membrane arrangement that have been fixed to an outer shell or housing by a potting process. Filtration elements that have been subjected to potting can be fixed on one end or on both ends of the membrane arrangement to the outer shell or housing.

In one embodiment, filtration elements or filtration modules according to the invention discharge permeate directly through an opening in the tube housing or indirectly through a discharge tube located within the membrane element. Particularly when indirect discharge is facilitated the discharge tube can for example be placed in the center of the membrane element and the capillaries of the membrane element are arranged in bundles surrounding the discharge tube.

In another embodiment, a filtration element for filtering comprises an element housing, wherein at least one membrane arrangement and at least one permeate collecting tube are arranged within the element housing and wherein the at least one permeate collecting tube is arranged in an outer part of the filtration element.

The permeate collecting tube inside filtration elements or filtration modules may in one embodiment have cylindrical shape, wherein the cross-section may have any shape such as round, oval, triangular, square or some polygon shape. Preferred is a round shape, which leads to enhanced pressure resistance. Preferably the longitudinal center line of the at least one permeate collecting tube is arranged parallel to the longitudinal center line of the membrane element and the element housing. Furthermore, a cross-section of the permeate collecting tube may be chosen according to the permeate volume produced by the membrane element and pressure losses occurring in the permeate collecting tube. The diameter of the permeate collecting tube may be less than half, preferred less than a third and particularly preferred less than a quarter of the diameter of the element housing.

The permeate collecting tube and the membrane element may have different or the same shape. Preferably the permeate collecting tube and the membrane element have the same shape, particularly a round shape. Thus, the at least one permeate collecting tube can be arranged within the circumferential ring extending from the radius of the element housing to half, preferred a third and particularly preferred a quarter of the radius of the element housing.

In one embodiment the permeate collecting tube is located within the filtration element such that the permeate collecting tube at least partially touches the element housing. This allows placing the filtration element in the filtration module or system such that the permeate collecting tube is arranged substantially at the top of the filtration element in horizontal arrangement. In this context substantially at the top includes any position in the outer part of the membrane that lies within ±45°, preferred ±10° from a vertical center axis in a transverse plane of the filtration element. Here the vertical center axis in a transverse plane is perpendicular to the horizontal center axis in the transverse plane and to the longitudinal center axis extending along the long axis of the filtration element. By arranging the permeate collecting tube this way, air residing within the membrane element before start-up of the filtration module or system can be collected in the permeate collecting tube, which can then easily be vented upon start up by starting the filtration operation. In particular, air pockets can be displaced by permeate which is fed to the filtration module or system and filtered by the membrane element on start up. By releasing air from the filtration module or system the active area of the membrane element increases, thus increasing the filtering effect. Furthermore the risk of fouling due to trapped air pockets decreases and pressure surges as well as the risk of breakage of the membrane element are minimized.

In another embodiment of the filtration element at least two permeate collecting tubes may be arranged in the filtration element, particularly within the element housing. By providing more than one permeate collecting tube the output volume of permeate at a constant pressure can be increased and adjusted to the permeate volume produced by the membrane element. Furthermore the pressure loss is reduced if high backwashing flows are required. Here at least one first permeate collecting tube is arranged in the outer part of the filtration element and at least one second permeate collecting tube can be arranged in the inner or the outer part of the filtration element. For example, two permeate collecting tubes may be arranged in the outer part or one first permeate collecting tube may be arranged in the outer part and another second permeate collecting tube may be arranged in the inner part of the filtration element.

Preferably at least two permeate collecting tubes are arranged opposite each other in the outer part or the outer circumferential ring of the filtration element. By providing at least two permeate collecting tubes opposite each other in the outer part of the filtration element, the filtration element can be placed in a filtration module or system such that one of the tubes are arranged substantially at the top of the element while the other tube is arranged substantially at the bottom. This way ventilation can be achieved through the top tube, while the additional bottom tube increases output volume at a constant pressure.

In another embodiment the filtration element further comprises a perforated tube arranged around the membrane element, in particular composing at least one membrane arrangement comprising at least one hollow fiber membrane. The perforations may be formed by holes or other openings located in regular or irregular distances along the tube. Preferably, the membrane element, in particular the membrane arrangement is enclosed by the perforated tube. With the perforated tube the axial pressure distribution along the filtration element can be equalized in filtration and back washing operation. Thus, the permeate flow is evenly distributed along the filtration element and hence the filtering effect can be increased.

In another embodiment the perforated tube is arranged such that an annular gap is formed between the element housing and the perforated tube. Known membrane elements do not have a distinct border and the membrane element are directly embedded in a housing of the filtration element. This leads to an uneven pressure distribution in axial direction as the axial flow is disturbed by the membrane element.

In another embodiment the membrane element comprises multibore membranes. The multi bore membranes preferably comprise more than one capillary, which runs in a channel along the longitudinal axis of the membrane element or the filtration element. Particularly, the multi bore membrane comprises at least one substrate forming the channels and at least one active layer arranged in the channels forming the capillaries. Embedding the capillaries within a substrate allows forming a multi bore membrane, which are considerably easier to mount and mechanically more stable than membranes based on single hollow fibers. As a result of the mechanical stability, the multi bore membrane is particularly suitable for cleaning by back washing, where the filtration direction is reversed such that a possible fouling layer formed in the channels is lifted and can be removed. In combination with the arrangements of the permeate collecting tube leading to an even pressure distribution within the membrane element, the overall performance and stability of the filtration element is further enhanced.

In contrast to designs with a central discharge tube and single bore membranes, the distribution of the multi bore membranes is advantageous in terms of producing lower pressure loss in both operational modes filtration and backwash. Such designs further increases stability of the capillaries by equalizing the flow or pressure distribution across the membrane element. Thus, such designs avoid adverse effects on the pressure distribution among the capillaries of the membrane element. For designs with a central permeate collecting tube permeate flows in filtration mode from the outer capillaries of the membrane to the inner capillaries and has to pass a decreasing cross-section. In backwashing mode the effect reverses in that sense, that the flow volume decreases towards the outer capillaries and thus the cleaning effect decreases towards the outside as well. In fact the uneven flow and pressure distribution within the membrane element leads to the outer capillaries having a higher flow in filtration mode and hence building up more fouling layer than the inner capillaries. In backwashing mode, however, this reverses to the contrary with a higher cleaning effect for the inner capillaries, while the outer exhibit a higher build up. Thus the combination of the permeate collecting tube in the outer part of the filtration element and the use of the multi-bore membrane synergistically lead to a higher long-term stability of the filtration element.

Another aspect of the invention are membrane modules comprising membranes or membrane elements according to the invention.

In one embodiment, membrane modules according to the invention comprise a filtration element which is arranged within a module housing. The raw water is at least partly filtered through the filtration element and permeate is collected inside the filtration module and removed from the filtration module through an outlet. In one embodiment the filtrate (also referred to as "bermeate") is collected inside the filtration module in a permeate collection tube. Normally the element housing, optionally the permeate collecting tube and the membrane arrangement are fixed at each end in membrane holders comprising a resin, preferably an epoxy resin, in which the filtration element housing, the membranes, preferably multibore membranes, and optionally the filtrate collecting tube are embedded.

Membrane modules can in one embodiment for example have cylindrical shape, wherein the cross-section can have any shape such as round, oval, triangular, square or some polygon shape. Preferred is a round shape, which leads to a more even flow and pressure distribution within the membrane element and avoids collection of filtered material in certain areas such as corners for e.g. square or triangular shapes.

In one embodiment, membrane modules according to the invention have an inside-out configuration ("inside feed") with the filtrate flowing from the inside of a hollow fiber or multibore membrane to the outside.

In one embodiment, membrane modules according to the invention have an outside-in filtration configuration ("outside feed").

In a preferred embodiment, membranes, filtration elements, filtration modules and filtration systems according to the invention are configured such that they can be subjected to backwashing operations, in which filtrates is flushed through membranes in opposite direction to the filtration mode.

In one embodiment, membrane modules according to the invention are encased.

In another embodiment, membrane modules according to the invention are submerged in the fluid that is to be subjected to filtration.

In one embodiment, membranes, filtration elements, filtration modules and filtration systems according to the invention are used in membrane bioreactors.

In one embodiment, membrane modules according to the invention have a dead-end configuration and/or can be operated in a dead-end mode.

In one embodiment, membrane modules according to the invention have a crossflow configuration and/or can be operated in a crossflow mode.

In one embodiment, membrane modules according to the invention have a directflow configuration and/or can be operated in a directflow mode.

In one embodiment, membrane modules according to the invention have a configuration that allow the module to be cleaned and scoured with air.

In one embodiment, filtration modules include a module housing, wherein at least one filtration element as described above is arranged within the module housing. Hereby the filtration element is arranged vertically or horizontally. The module housing is for instance made of fiber reinforced plastic (FRP) or stainless steel.

In one embodiment the at least one filtration element is arranged within the module housing such that the longitudinal center axis of the filtration element and the longitudinal center axis of the housing are superimposed. Preferably the filtration element is enclosed by the module housing, such that an annular gap is formed between the module housing and the element housing. The annular gap between the element housing and the module housing in operation allow for an even pressure distribution in axial direction along the filtration module.

In another embodiment the filtration element is arranged such that the at least one permeate collecting tube is located substantially at the top of the filtration module or filtration element. In this context substantially at the top includes any position in the outer part of the membrane element that lies within $\pm 45°$, preferred $\pm 10°$, particularly preferred $\pm 5°$ from a vertical center axis in a transverse plane of the filtration element. Furthermore, the vertical center axis in a transverse plane is perpendicular to the horizontal center axis in the transverse plane and to the longitudinal center axis extending along the long axis of the filtration element. By arranging the permeate collecting tube this way, air residing within the filtration module or system before start up can be collected in the permeate collecting tube, which can then easily be vented upon start up by starting the filtration operation. In particular, air pockets can be displaced by permeate, which is fed to the filtration module or system on start up. By releasing air from the filtration module or system the active area of the membrane element is increased, thus increasing the filtering effect. Furthermore, the risk of fouling due to trapped air pockets decreases. Further preferred the filtration module is mount horizontally in order to orientate the permeate collecting tube accordingly.

In another embodiment the filtration element is arranged such that at least two permeate collecting tubes are arranged opposite each other in the outer part of the filtration element. In this embodiment the filtration module can be oriented such that one of the permeate collecting tubes are arranged substantially at the top of the filtration element, while the other tube is arranged substantially at the bottom of the filtration element. This way the ventilation can be achieved through the top tube, while the bottom tube allows for a higher output volume at a constant pressure. Furthermore, the permeate collecting tubes can have smaller dimensions compared to other configurations providing more space to be filled with the membrane element and thus increasing the filtration capacity.

In one embodiment, membrane modules according to the invention can have a configuration as disclosed in WO 2010/121628, S. 3, Z. 25 to p. 9, ln 5 and especially as shown in FIG. 2 and FIG. 3 of WO 2010/121628.

In one embodiment membrane modules according to the invention can have a configuration as disclosed in EP 937 492, [0003] to [0020].

In one embodiment membrane modules according to the invention are capillary filtration membrane modules comprising a filter housing provided with an inlet, an outlet and a membrane compartment accommodating a bundle of membranes according to the invention, said membranes being cased at both ends of the membrane module in membrane holders and said membrane compartment being provided with discharge conduits coupled to the outlet for the conveyance of the permeate. In one embodiment said discharge conduits comprise at least one discharge lamella provided in the membrane compartment extending substantially in the longitudinal direction of the filtration membranes.

Another aspect of the invention are filtration systems comprising membrane modules according to the invention. Connecting multiple filtration modules normally increases the capacity of the filtration system. Preferably the filtration modules and the encompassed filtration elements are mounted horizontally and adapters are used to connect the filtration modules accordingly.

In one embodiment, filtration systems according to the invention comprise arrays of modules in parallel.

In one embodiment, filtration systems according to the invention comprise arrays of modules in horizontal position.

In one embodiment, filtration systems according to the invention comprise arrays of modules in vertical position.

In one embodiment, filtration systems according to the invention comprise a filtrate collecting vessel (like a tank, container).

In one embodiment, filtration systems according to the invention use filtrate collected in a filtrate collecting tank for backwashing the filtration modules.

In one embodiment, filtration systems according to the invention use the filtrate from one or more filtration modules to backwash another filtration module.

In one embodiment, filtration systems according to the invention comprise a filtrate collecting tube.

In one embodiment, filtration systems according to the invention comprise a filtrate collecting tube to which pressurized air can be applied to apply a backwash with high intensity.

In one embodiment, filtration systems according to the invention have a configuration as disclosed in EP 1 743 690, col. 2, ln. 37 to col. 8, ln. 14 and in FIG. 1 to FIG. 11 of EP 1 743 690; EP 2 008 704, col. 2, ln. 30 to col. 5, ln. 36 and FIG. 1 to FIG. 4; EP 2 158 958, col. 3, ln. 1 to col. 6, ln. 36 and FIG. 1.

In one embodiment filtration systems according to the invention comprise more than one filtration module arranged vertically in a row, on both of whose sides an inflow pipe is arrayed for the fluid to be filtered and which open out individually allocated collecting pipes running lengthwise per row, whereby each filtration module has for the filtrate at least one outlet port which empties into a filtrate collecting pipe, whereby running along the sides of each row of filtration modules is a collecting pipe that has branch pipes allocated to said pipe on each side of the filtration module via which the allocated filtration module is directly connectable, wherein the filtrate collecting pipe runs above and parallel to the upper two adjacent collecting pipes.

In one embodiment, filtration systems according to the invention comprise a filtrate collecting pipe that is connected to each of the filtration modules of the respective filtration system and that is designed as a reservoir for backwashing the filtration system, wherein the filtration system is configured such that in backwashing mode pressurized air is applied to the filtrate collecting pipe to push permeate water from the permeate collecting pipe through the membrane modules in reverse direction.

In one embodiment, filtration systems according to the invention comprise a plurality of module rows arranged in parallel within a module rack and supplyable with raw water through supply/drain ports and each end face via respectively associated supply/drain lines and each including a drain port on a wall side for the filtrate, to which a filtrate collecting line is connected for draining the filtrate, wherein valve means are provided to control at least one filtration and backwashing mode, wherein, in the backwashing mode, a supply-side control valve of the first supply/drain lines carrying raw water of one module row is closed, but an associated drain-side control valve of the other supply/drain line of one module row serving to drain backwashing water is open, whereas the remaining module rows are open, to ensure backwashing of the one module row of the module rack by the filtrate simultaneously produced by the other module rows.

Hereinafter, when reference is made to the use of "membranes" for certain applications, this shall include the use of the membranes as well as filtration elements, membrane modules and filtration systems comprising such membranes and/or membrane modules.

In a preferred embodiment, membranes according to the invention are used for the treatment of sea water or brackish water.

In one preferred embodiment of the invention, membranes according to the invention, particularly RO, FO or NF membranes are used for the desalination of sea water or brackish water.

Membranes according to the invention, particularly RO, FO or NF membranes are used for the desalination of water with a particularly high salt content of for example 3 to 8% by weight. For example membranes according to the invention are suitable for the desalination of water from mining and oil/gas production and fracking processes, to obtain a higher yield in these applications.

Different types of membrane according to the invention can also be used together in hybrid systems combining for example RO and FO membranes, RO and UF membranes, RO and NF membranes, RO and NF and UF membranes, NF and UF membranes.

In another preferred embodiment, membranes according to the invention, particularly NF, UF or MF membranes are used in a water treatment step prior to the desalination of sea water or brackish water.

In another preferred embodiment membranes according to the invention, particularly NF, UF or MF membranes are used for the treatment of industrial or municipal waste water.

Membranes according to the invention, particularly RO and/or FO membranes can be used in food processing, for example for concentrating, desalting or dewatering food liquids (such as fruit juices), for the production of whey protein powders and for the concentration of milk, the UF permeate from making of whey powder, which contains lactose, can be concentrated by RO, wine processing, providing water for car washing, making maple syrup, during electrochemical production of hydrogen to prevent formation of minerals on electrode surface, for supplying water to reef aquaria.

Membranes according to the invention, particularly UF membranes can be used in medical applications like in dialysis and other blood treatments, food processing, concentration for making cheese, processing of proteins, desalting and solvent-exchange of proteins, fractionation of proteins, clarification of fruit juice, recovery of vaccines and antibiotics from fermentation broth, laboratory grade water purification, drinking water disinfection (including removal of viruses), removal of endocrines and pesticides combined with suspended activated carbon pretreatment.

Membranes according to the invention, particularly RO, FO, NF membranes can be used for rehabilitation of mines, homogeneous catalyst recovery, desalting reaction processes.

Membranes according to the invention, particularly NF membranes, can be used for separating divalent ions or heavy and/or radioactive metal ions, for example in mining applications, homogeneous catalyst recovery, desalting reaction processes.

EXAMPLES

Abbreviations

DCDPS 4,4'-Dichlorodiphenylsulfone
DHDPS 4,4'-Dihydroxydiphenylsulfone
NMP N-methylpyrrolidone
DMAc Dimethylacetamide
PWP pure water permeation
MWCO molecular weight cutoff
DMF dimethylformamide The viscosity of copolymers was measured as a 1% by weight solution of the copolymer in NMP at 25° C. according to DIN EN ISO 1628-1.

Copolymers were isolated from their solution by precipitation of solutions of the copolymers in water at room temperature (height of spray reactor 0.5 m, flux: 2.5 l/h). The so obtained beads were then extracted with water at 85° C. for 20 hours (water flow 160 l/h). The beads were then dried to a water content of less than 0.1% by weight.

The molecular weight distribution and the average molecular weight of the copolymers were determined by GPC measurements in DMAc.

GPC-measurements were done using Dimethylacetamide/ 0.5 wt.-% LiBr as eluent. The concentration of the polymer solution was 4 mg/ml. After filtration (pore size 0.2 μm), 100 μl of this solution was injected in the GPC system. For the separation 4 different columns (heated to 80° C.) were used (GRAM pre-column, GRAM 30A, GRAM 1000A, GRAM 1000A, separation material: polyester copolymers). The system was operated with a flow rate of 1 ml/min. As detection system a DRI Agilent 1100 was used.

The calibration was done with PMMA-standards with molecular weights (Mn) from 800 to 1820000 g/mol.

The content of polyisobutene and of polyalkyleneoxide in the block copolymer was determined using $^1$H-NMR in $CDCl_3$. The signal intensity of resonance signals for H-atoms of polyisobutene and polyalkylene groups was compared to the signal intensity of resonance signals for H-atoms of aromatic groups comprised in polyarylene ether blocks. This comparison yields the ratio of polyalkylene oxide or polyisobutene to polyarylene ether that can be can be used to calculate the content of polyalkylene oxide and polyisobutene in the copolymer by weight.

The ratio of polyisobutene and polyethyleneoxide incorporated in the block copolymer is the ratio of the mass of polyalkylene oxide comprised in the block copolymer (determined by NMR, see above) to the mass of polyalkylene oxide used as a starting material.

The glass transition temperature of the products was determined by DSC analysis. All DSC-measurements were done using a DSC 2000 of TA Instruments at a heating rate of 20 k/min. About 5 mg material were placed in an Aluminum vessel and sealed. In the first run, the samples were heated to 250° C., rapidly cooled to −100° C. and then in the second run heated to 250° C. The Tg-values given were determined in the second run.

The contact angles between the water and the surface of the films prepared by melt pressing the polymer samples were obtained using a contact angle measuring instrument (Drop shape analysis system DSA 10 MK 2 from Krüss GmbH Germany).

For the contact angle measurement a sample of 2 cm$^2$ was fixed on an object plate. A water drop was put on the samples with a microliter gun. The shape of the droplet was recorded by a CCD-camera. An image recognition software analyzed the contact angle.

For determining the flexibility and the hydrophilicity of the copolymers obtained, a 20% by weight solution of the respective copolymer in DMF was applied onto a glass surface using a casting knife to obtain a coating with a thickness of 300 μm. The solvent was left to evaporate and the polymeric films obtained were left to stand for 12 hours at room temperature and 12 hours at 80° C. and 100 mbar. The polymeric films were removed from the glass surface and extracted for 16 hours using water with a temperature of 85° C. The content of organic solvent in the polymeric films so obtained was then below 0.1% by weight (determined by 1H-NMR).

The polymeric films were then dried for eight hours at 80° C. and a pressure of 100 mbar. Five tensile test samples were cut from the films using a die-cutter to obtain test specimen of the type 5A (ISO 527-2). The tensile strength of the films was determined at an elongation rate of 5 mm/min to determine the elongation at break. The numbers given below are the average values of 5 tests per polymer film.

To determine the hydrophilicity, samples prepared as described above were stored in demineralized water for five days. The samples were then wiped dry and the weight of the stored samples was determined. The water uptake was calculated relative to the weight of the sample prior to the storage in water.

Example 1: Preparation of Phenol Terminated Polyisobutene: Continuous Polymerization of Isobutene and In Situ Termination with Phenol in a Milli-Reactor Liquid isobutene (0.8 mol/h) was mixed continuously with a solution of 1-butyl chloride (2.63 mol/h), phenyltriethoxysilane (10 mmol/h) and 1,3-dicumyl chloride (18 mmol/h) in a micro-mixer, and subsequently mixed homogeneously with a solution of 1-butyl chloride (2.62 mol/h) and $TiCl_4$ (39 mmol/h) in a second micro-mixer at reaction temperature. The reaction solution formed was subsequently pumped through a temperature-controlled reaction capillary made of Hastelloy (internal diameter 4 mm, length 27 m) with a defined, constant flow rate of 700 g/h. In a third micro-mixer, the polymer solution formed was mixed continuously at ambient temperature with a mixture of phenol (0.5 mol/h), 1-butyl chloride (4.32 mol/h) and aluminum trichloride (50.2 mmol/h) and supplied to a 2 l reaction flask for 30 min. After stirring at room temperature for 2 hours, the reaction was terminated by addition of methanol. The solution was washed three times with methanol/water (80/20) mixture and the hexane phase dried over sodium sulfate, filtered and concentrated by rotary evaporation at 120° C./10 mbar.

GPC analysis (polystyrene standard, result converted to polyisobutene, ERC-RI-101 detector, tetrahydrofuran eluent, flow rate: 1.2 ml/min): Mn=2200 g/mol, Mw=2750 g/mol, PDI=1.25 1H FT NMR (500 MHz, 16 scans, $CD_2Cl_2$)

Aromatic starter in polymer: 7.38 ppm, 1H, s; 7.15 ppm, 3H, mp; phenol functionalization: 7.22 ppm, 2H, d; 6.74 ppm, 2H, d.

Mn from 1H-NMR: 1760 g/mol

Example 2: Preparation of PEO-polyisobutene-PEO 7.4 g of potassium tert.-butylate were dissolved in 760 g of the phenol terminated polyisobutene obtained in example 1. The tert.-butanol that was formed was removed by distillation at 130° C. and 50 mbar. 700 g of the mixture obtained was filled into a 2 liter reactor and heated to 100° C. To the reactor, ethylene oxide was added until the pressure inside the reactor was 5 to 6 bar. This pressure was maintained at a constant level by constant addition of ethylene oxide over 8 hours. After eight hours an amount of 730 g of ethylene oxide was consumed. The reactor was cooled to ambient temperature and the pressure was released. The product mixture was dissolved in 2 l of n-hexane and washed three times with 1 l of hydrochloric acid (5% by weight in water) and 1 l of demineralized water. The product was dried over sodium sulfate. The solvent was removed at 120° C. and 5 mbar to obtain 1200 g of polymer.

$^1$H-NMR: (500 MHz, 16 scans, $CD_2Cl_2$): 7.25 d; 6.75 d; 3.75-3.25 multiplet; 1.8 s; 1.5 s; 1.2 s/d; 0.8 s.

$M_n$ (from NMR): 3070 g/mol

According to the 1H-NMR, the product comprised an average of 39 units of isobutene (ca. 2200 g/mol) and two blocks with an average of 11 units of von ethylene oxide (ca. 500 g/mol).

Example 3

In a 4 liter glass reactor fitted with a thermometer, a gas inlet tube and a Dean-Stark-trap, 574.16 g of DCDPS, 490.33 g of DHDPS, 70.4 g of the phenol terminated polyisobutene obtained in example 1 and 290.24 g of potassium carbonate with a volume average particle size of 32.4 µm were suspended in 1333 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of eight hours, the reaction was stopped by addition of 1667 ml of NMP with a temperature of 23° C. Nitrogen was bubbled through the mixture for one hour with a rate of 20 l/h and the mixture was let to cool to room temperature. The potassium chloride formed in the reaction was removed by filtration.

Example 4

In a 4 liter glass reactor fitted with a thermometer, a gas inlet tube and a Dean-Stark-trap, 574.16 g of DCDPS, 485.33 g of DHDPS, 105.6 g of the phenol terminated polyisobutene obtained in example 1 and 290.24 g of potassium carbonate with a volume average particle size of 32.4 µm were suspended in 1333 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of eight hours, the reaction was stopped by addition of 1667 ml of NMP with a temperature of 23° C. Nitrogen was bubbled through the mixture for one hour with a rate of 20 l/h and the mixture was let to cool to room temperature. The potassium chloride formed in the reaction was removed by filtration.

Example 5

In a 4 liter glass reactor fitted with a thermometer, a gas inlet tube and a Dean-Stark-trap, 574.16 g of DCDPS, 490.33 g of DHDPS, 122.0 g of the PEO terminated polyisobutene obtained in example 2 and 290.24 g of potassium carbonate with a volume average particle size of 32.4 µm were suspended in 1333 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of eight hours, the reaction was stopped by addition of 1667 ml of NMP with a temperature of 23° C. Nitrogen was bubbled through the mixture for one hour with a rate of 20 l/h and the mixture was let to cool to room temperature. The potassium chloride formed in the reaction was removed by filtration.

Example 6

In a 4 liter glass reactor fitted with a thermometer, a gas inlet tube and a Dean-Stark-trap, 574.16 g of DCDPS, 474.53 g of DHDPS, 183.0 g of the phenol terminated polyisobutene obtained in example 1 and 290.24 g of potassium carbonate with a volume average particle size of 32.4 µm were suspended in 1333 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of eight hours, the reaction was stopped by addition of 1667 ml of NMP with a temperature of 23° C. Nitrogen was bubbled through the mixture for one hour with a rate of 20 l/h and the mixture was let to cool to room temperature. The potassium chloride formed in the reaction was removed by filtration.

Comparative Example 7

Commercially available polyethersulfone with a viscosity number of 65.0 ml/g.

TABLE 1

Analytical data of block copolymers prepared in experiments 3 to 7

|  | 3 | 4 | 5 | 6 | 7 |
|---|---|---|---|---|---|
| viscosity number [ml/g] | 62.1 | 63.3 | 75.2 | 75.4 | 65 |
| PIB content (% by weight) | 6.8 | 9.7 | 6.3 | 9.0 | n/a |
| Mw [kg/mol] (GPC) | 67.1 | 68.5 | 75.1 | 76.3 | 62.7 |
| Tg [° C.] | 219 | 218 | 212 | 209 | 226 |
| Elongation at Break [%] | 56 | 78 | 62 | 85 | 23 |
| Water Uptake [% by weight] | 1.4 | 1.4 | 5.1 | 7.2 | 1.8 |

Block copolymers according to the invention showed an improved elongation at break over comparative examples.

Examples M1 to M5: Preparation of PESU Flat Sheet Membranes

Into a three neck flask equipped with a magnetic stirrer, 75 g of N-methylpyrrolidone (NMP), 5 g of polyvinylpyrrolidone (Mw=1.3*10⁶ g/mol, Kollidon® K90) and 20 g of a copolymer according to examples 3 to 7 were added. The composition of the membranes prepared is given in table 2. The mixture was kept at 60° C. under gentle stirring until a homogeneous clear viscous solution was obtained. The solution was degassed overnight at room temperature at a pressure of 100 mbar. After that the membrane solution was reheated at 60° C. for 2 hours and casted onto a glass plate with a casting knife (200 microns) at 60° C. using an Erichsen Coating machine operating at a speed of 5 mm/min. The membrane film was allowed to rest for 30 seconds before immersion in a water bath at 25° C. for 10 minutes.

After the membrane has detached from the glass plate, the membrane was carefully transferred into a water bath for 24 h. Afterwards the membrane was transferred into a bath containing 2500 ppm NaOCl at 60° C. for 2 h to remove PVP. After that process the membrane was washed with water at 60° C. and then one time with a 0.5 wt.-% solution of NaBisulfite to remove active chlorine. After several washing steps with water the membrane was stored wet until characterization started.

A flat sheet continuous film with micro structural characteristics of UF membranes having dimension of at least 10×15 cm size was obtained. The membrane comprised a top thin skin layer (1-3 microns) and a porous layer underneath (thickness: 100-150 microns).

Membrane Characterization:

Using a pressure cell with a diameter of 60 mm, the pure water permeation (PWP) of the membranes was tested using ultrapure water (salt-free water, additionally filtered by a Millipore UF-system). In a subsequent test, a solution of different PEG-Standards was filtered at a pressure of 0.15 bar. By GPC measurement of the feed and the permeate, the molecular weight cut-off (MWCO) was determined. The data obtained is summarized in Table 2.

TABLE 2

Characterization of membranes obtained in examples M1 to M5

| | Sample | | | | |
|---|---|---|---|---|---|
| | M1 | M2 | M3 | M4 | M5 |
| Polymer | 3 | 4 | 5 | 6 | 7 |
| PWP [l/m² * h * bar] | 890 | 930 | 1350 | 1500 | 750 |
| MWCO | 86 | 105 | 94 | 92 | 88 |

The membranes comprising block copolymers according to the invention show higher water permeability than reference membranes. Furthermore, the membranes comprising copolymers according to the invention show high tensile strengths and elongation at break.

The invention claimed is:

1. A copolymer, comprising polyarylene ether blocks and hydrophilic-hydrophobic blocks,
   wherein:
   said hydrophilic-hydrophobic blocks comprise polyisobutene blocks; and
   said hydrophilic-hydrophobic blocks comprise polyisobutene blocks with terminal phenolic ether groups, and said phenolic ether groups are etherified with polyalkyleneoxides.

2. The copolymer according to claim 1, wherein said hydrophilic-hydrophobic blocks comprise polyisobutene blocks with terminal ether groups.

3. The copolymer according to claim 1, wherein said hydrophilic-hydrophobic blocks comprise polyisobutene blocks with terminal phenolic ether groups.

4. The copolymer according to claim 2, wherein said ether groups are obtained by alkoxylation of a hydroxy terminated polyisobutene with ethylene oxide or propylene oxide or mixtures thereof.

5. The copolymer according to claim 1, wherein said hydrophilic-hydrophobic blocks comprise structural units according to formula (I):

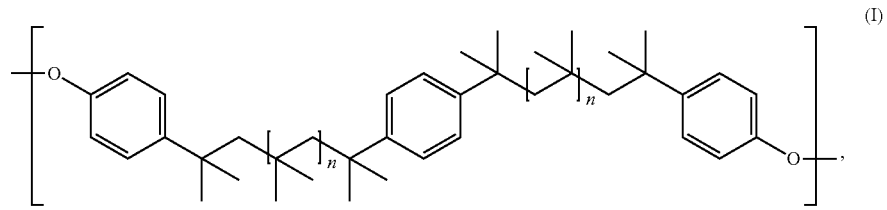

in which n=2 to 1000.

6. The copolymer according to claim 1, wherein said hydrophilic-hydrophobic blocks comprise blocks according to formula (II):

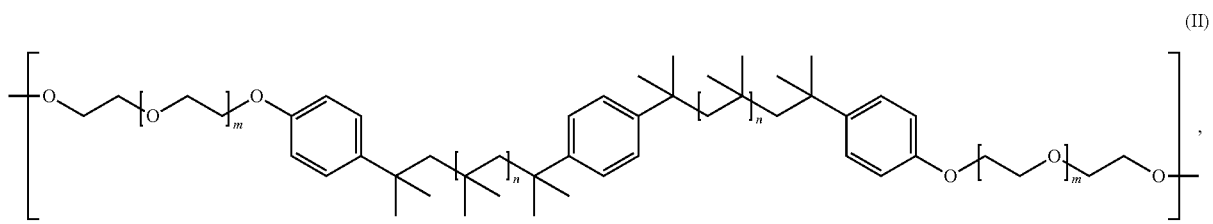

(II)

wherein:
n=2 to 1000;
m=1 to 300; and
said blocks are at least partly covalently bound to polyarylene ether blocks.

7. The copolymer according to claim 1, having a structure (III):

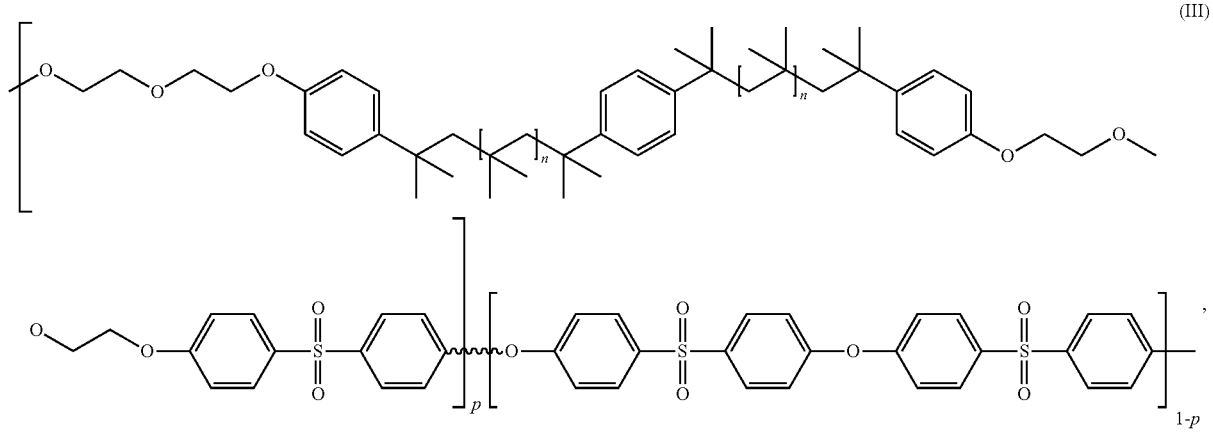

(III)

wherein:
n=2 to 1000;
m=1 to 300; and
p=0.003 to 0.25.

8. A process for making the copolymer according to claim 1, the process comprising reacting aromatic bishalogeno compounds and aromatic biphenols or salts thereof in the presence of at least one base and in the presence of hydrophilic-hydrophobic block copolymers comprising polyisobutene blocks.

9. A membrane, comprising a block copolymer comprising polyarylene ether blocks and hydrophilic-hydrophobic blocks, wherein said hydrophilic-hydrophobic blocks comprise polyisobutene blocks.

10. The membrane according to claim 9, wherein said hydrophilic-hydrophobic blocks comprise polyisobutene blocks with terminal ether groups.

11. The membrane according to claim 9, wherein said hydrophilic-hydrophobic blocks comprise polyisobutene blocks with terminal phenolic ether groups.

12. The membrane according to claim 9, wherein said hydrophilic-hydrophobic blocks comprise polyisobutene blocks with terminal phenolic ether groups and wherein said phenol groups are etherified with polyalkyleneoxides.

13. The membrane according to claim 10, wherein said ether groups are obtained by alkoxylation with ethylene oxide or propylene oxide or mixtures thereof.

14. The membrane according to claim 9, wherein said hydrophilic-hydrophobic blocks comprise structural units according to formula (I):

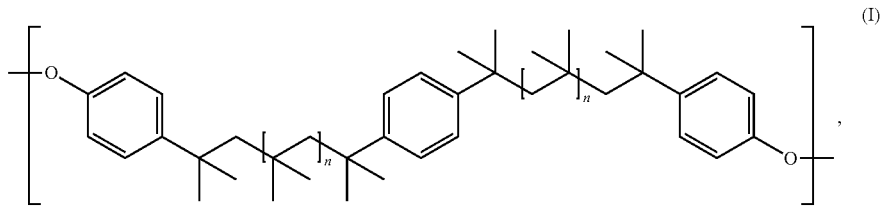

(I)

in which n=2 to 1000.

15. The membrane according to claim 9, wherein said hydrophilic-hydrophobic blocks comprise blocks according to formula (II):

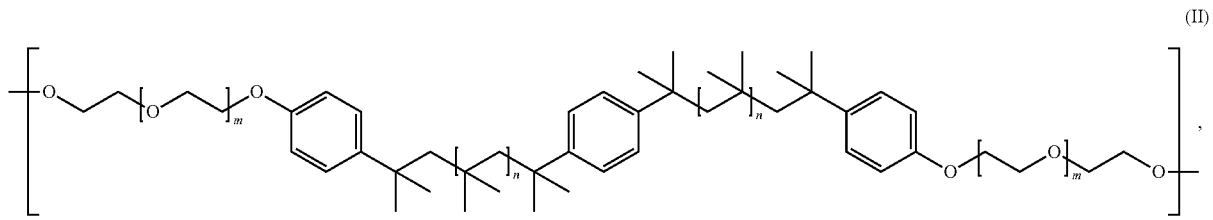

(II)

wherein:
n=2 to 1000;
m=1 to 300; and
said blocks are at least partly covalently bound to polyarylene ether blocks.

16. The membrane according to claim 9, having a structure (III):

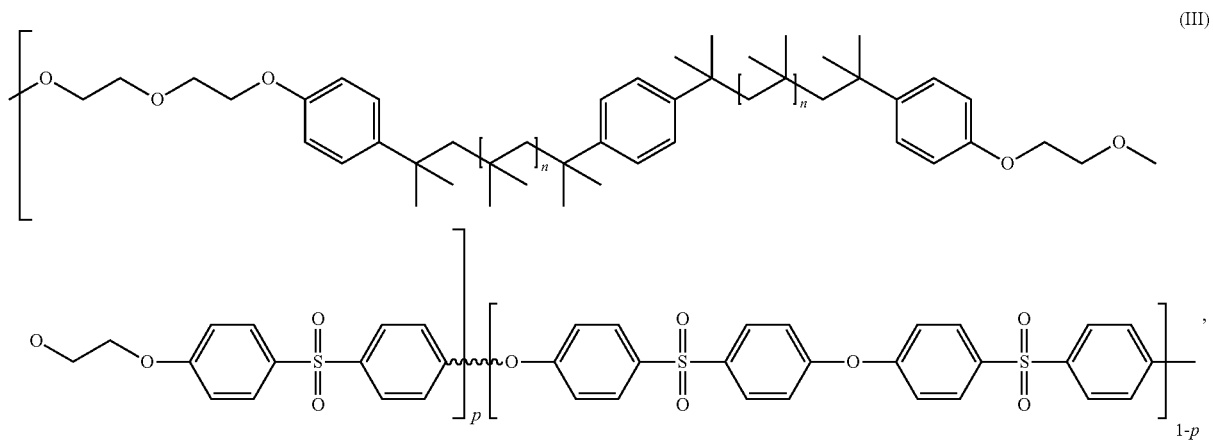

(III)

wherein:
n=2 to 1000;
m=1 to 300; and
p=0.003 to 0.25.

17. The membrane according to claim 9, wherein said hydrophilic-hydrophobic blocks are obtained by a process comprising:
a) polymerizing isobutene or an isobutene-containing monomer mixture in the presence of a Lewis acid and of an initiator;
b) terminating the polymerization with a mixture of at least one phenol and at least one Lewis acid and/or at least one Brønsted acid; and
c) derivatizing terminal phenol groups by alkoxylation.

18. The membrane according to claim 9, wherein said polyarylene ether blocks correspond to formula (IV):

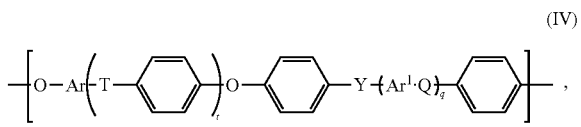

(IV)

wherein:
t, q: each independently represent 0, 1, 2 or 3;

Q, T, Y: each independently represent a chemical bond or group selected from the group consisting of —O—, —S—, —SO$_2$—, S=O, C=O, —N=N—, and —CR$^a$R$^b$— where R$^a$ and R$^b$ are each independently a hydrogen atom or a C$_1$-C$_{12}$-alkyl, C$_1$-C$_{12}$-alkoxy or C$_6$-C$_{18}$-aryl group, where at least one of Q, T and Y is not —O—, and at least one of Q, T and Y is —SO$_2$—; and Ar, Ar$^1$: each independently represent an arylene group having from 6 to 18 carbon atoms.

19. The membrane according to claim 9, wherein said polyarylene ether is a polysulfone, a polyethersulfone or a polyphenylenesulfone.

20. The membrane according to claim 9, comprising said block copolymer in an amount of 0.01% by weight to 100% by weight.

21. The membrane according to claim 9, wherein said membrane is a UF, MF, RO, FO or NF membrane.

22. A process for filtering water, the process comprising contacting water with the membrane according to claim 9.

23. A membrane element, comprising membranes according to claim 9.

24. A membrane module, comprising membranes according to claim 9.

25. A filtration system, comprising membrane modules according to claim 24.

* * * * *